(12) United States Patent
Sun et al.

(10) Patent No.: US 12,144,003 B2
(45) Date of Patent: Nov. 12, 2024

(54) METHOD AND APPARATUS FOR TRANSMITTING DATA

(71) Applicant: Samsung Electronics Co., Ltd., Suwon-si (KR)

(72) Inventors: Feifei Sun, Beijing (CN); Yi Wang, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/064,167

(22) Filed: Dec. 9, 2022

(65) Prior Publication Data

US 2023/0105623 A1    Apr. 6, 2023

Related U.S. Application Data

(63) Continuation of application No. 16/831,387, filed on Mar. 26, 2020, now Pat. No. 11,553,471.

(30) Foreign Application Priority Data

Mar. 29, 2019 (CN) .......................... 201910252095.9
Nov. 7, 2019 (CN) .......................... 201911084069.6

(51) Int. Cl.
*H04W 72/23* (2023.01)
(52) U.S. Cl.
CPC .................................. *H04W 72/23* (2023.01)
(58) Field of Classification Search
CPC ... H04W 72/23; H04W 52/248; H04W 52/48; H04W 72/0446; H04W 74/0808
See application file for complete search history.

(56) References Cited

U.S. PATENT DOCUMENTS

| 10,123,344 | B2 | 11/2018 | Chen et al. |
| 10,219,295 | B2 | 2/2019 | Hugl et al. |
| 10,813,129 | B2 | 10/2020 | Li et al. |
| 11,166,323 | B2 | 11/2021 | Kim et al. |
| 11,206,578 | B2 | 12/2021 | Agiwal et al. |

(Continued)

FOREIGN PATENT DOCUMENTS

| CN | 103227694 A | 7/2013 |
| CN | 105009671 A | 10/2015 |

(Continued)

OTHER PUBLICATIONS

Communication under Rule 71(3) EPC dated Jul. 10, 2023, in connection with European Patent Application No. 20166275.6, 89 pages.

(Continued)

*Primary Examiner* — Chi Ho A Lee

(57) ABSTRACT

The present disclosure provides a user equipment and a method for performing data transmission. The method includes receiving at least one of downlink control information (DCI) or higher layer signaling from a base station; determining a transmission format of the data transmission based on at least one of the DCI or the higher layer signaling; and performing the data transmission based on the determined transmission format. The present disclosure also provides a base station and a method for performing data transmission.

20 Claims, 17 Drawing Sheets

(56) References Cited

U.S. PATENT DOCUMENTS

| | | | |
|---|---|---|---|
| 11,343,045 | B2 | 5/2022 | Xu et al. |
| 11,632,190 | B2 | 4/2023 | Xu et al. |
| 2015/0257088 | A1 | 9/2015 | Hsu et al. |
| 2017/0006644 | A1 | 1/2017 | Tsuboi et al. |
| 2017/0295525 | A1 | 10/2017 | Rashid et al. |
| 2018/0123744 | A1* | 5/2018 | Nogami .............. H04W 52/248 |
| 2018/0324799 | A1 | 11/2018 | Li et al. |
| 2019/0053211 | A1 | 2/2019 | Ying et al. |
| 2019/0149365 | A1 | 5/2019 | Chatterjee et al. |
| 2020/0037245 | A1 | 1/2020 | Lu et al. |
| 2020/0045696 | A1* | 2/2020 | Huang .............. H04W 74/0808 |
| 2020/0267667 | A1* | 8/2020 | MolavianJazi ....... H04W 52/48 |
| 2020/0296697 | A1 | 9/2020 | Hwang et al. |
| 2020/0344026 | A1 | 10/2020 | Ma et al. |
| 2021/0266912 | A1 | 8/2021 | Ma et al. |
| 2021/0281458 | A1 | 9/2021 | Takeda et al. |
| 2021/0307044 | A1 | 9/2021 | Bae et al. |
| 2021/0314982 | A1 | 10/2021 | Panteleev et al. |
| 2021/0314983 | A1 | 10/2021 | Karaki et al. |
| 2021/0321446 | A1 | 10/2021 | Lee et al. |
| 2021/0336750 | A1 | 10/2021 | Zhou et al. |
| 2022/0061067 | A1* | 2/2022 | Andersson ............ H04W 72/23 |
| 2022/0095310 | A1 | 3/2022 | Li et al. |
| 2022/0116881 | A1 | 4/2022 | Shin et al. |
| 2022/0116952 | A1* | 4/2022 | Lee ................... H04W 72/0446 |
| 2022/0174667 | A1* | 6/2022 | Lei ........................ H04W 72/23 |

FOREIGN PATENT DOCUMENTS

| | | |
|---|---|---|
| CN | 105766027 A | 7/2016 |
| CN | 106992847 A | 7/2017 |
| CN | 107046453 A | 8/2017 |
| CN | 107734581 A | 2/2018 |
| CN | 108282879 A | 7/2018 |
| CN | 109391448 A | 2/2019 |
| CN | 109479314 A | 3/2019 |
| WO | 2018101574 A1 | 6/2018 |

OTHER PUBLICATIONS

European Search Report dated Sep. 8, 2023, in connection with European Patent Application No. 23178579.1, 14 pages.

Vivo, "PUSCH enhancements for URLLC," R1-1812314, 3GPP TSG RAN WG1 Meeting #95, Spokane, USA, Nov. 12-16, 2018, 4 pages.

Samsung, "Multi-Slot Long PUCCH Transmission," R1-1715993, 3GPP TSG RAN WG1 Meeting NR#3, Nagoya, Japan, Sep. 18-21, 2017, 4 pages.

"5G; NR; Physical layer procedures for data (3GPP TS 38.214 version 15.3.0 Release 15)", ETSI TS 138 214 v15.3.0 (Oct. 2018), 99 pages.

MCC TF160, "Updated NR ASP definitions", 3GPPRAN5—TTCN Workshop #43, Oct. 30, 2018, R5w180313, 103 pages.

Nokia et al., "Summary of Friday offline discussion on potential enhancements for PUSCH for NR URLLC (AI 7.2.6.1.3)", 3GPP TSG-RAN WG1 Meeting #96, Feb. 25-Mar. 1, 2019, R1-1903797, 39 pages.

Partial European Search Report dated Aug. 26, 2020 in connection with European Patent Application No. 20 16 6275, 33 pages.

Samsung, "Discussion on sub-PRB allocation for eFeMTC", 3GPP TSG RAN WG1 Meeting 91, Nov. 27-Dec. 1, 2017, R1-1720263, 9 pages.

Communication pursuant to Article 94(3) EPC dated Sep. 9, 2021 in connection with European Patent Application No. 20 166 275.6, 20 pages.

Communication under Rule 71(3) EPC dated Mar. 27, 2023, in connection with European Application No. 20166275.6, 90 pages.

Notice of First Examination Opinion dated Apr. 26, 2024, in connection with Chinese Application No. 201911084069.6, 21 pages.

Examination report dated Feb. 13, 2024, in connection with Indian Application No. 202014013494, 7 pages.

Ericsson, "Email Discussion Summary [100#30][NR] L1 CAI meas config," Tdoc R2-1801166, 3GPP TSG-RAN WG2 NR AH#3, Vancouver, Canada, Jan. 22-26, 2018, 44 pages.

Li, et al., "Cooperative Device-to-Device Communication With Network Coding for Machine Type Communication Devices," IEEE Transactions on Wireless Communications, vol. 17, No. 1, Jan. 2018, 14 pages.

Yang, et al., "5G NR-multiplexing of eMBB and URLLC," Aug. 2018, 6 pages.

Notice of Grant of Invention Patent Right dated Aug. 30, 2024, in connection with Chinese Patent Application No. 201911084069.6, 10 pages.

* cited by examiner

METHOD AND APPARATUS FOR TRANSMITTING DATA

CROSS-REFERENCE TO RELATED APPLICATIONS

The application is a continuation of application Ser. No. 16/831,387, filed Mar. 26, 2020, which is based on and claims priority under 35 U.S.C. § 119 to Chinese Application Number 201910252095.9 filed on Mar. 29, 2019 and Chinese Application Number 201911084069.6 filed on Nov. 7, 2019, the disclosures of which are herein incorporated by reference in their entirety.

BACKGROUND

1. Field

The present application relates to the field of wireless communication technique, and in particular, to a user equipment, a base station and a method of data transmission.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human-centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The present application provides a user equipment, a base station and a method of data transmission, which may solve the problem how to determine a modulation and demodulation method, how to perform time domain resource allocation and mapping and data transmission. The technical solution is as follows:

In an exemplary embodiment, a method of data transmission is provided, comprising receiving downlink control information (DCI) and/or higher layer signaling transmitted by a base station; determining a transmission format of the data transmission according to the received DCI and/or the higher layer signaling, wherein, the transmission format includes at least one of the following: a time domain resource, a frequency domain resource, a preset number of transmission, a modulation scheme, a resource location for reference signal and a transport block size (TBS), and wherein, the preset number of transmission includes: a number of transmission and/or a number of repetition; and performing the data transmission based on the transmission format of data transmission.

The determining of the transmission format of data transmission according to the received DCI and/or the higher layer signaling may comprise determining a time domain resource allocation (TDRA) set according to the higher layer signaling, wherein, at least one entry of TDRA set includes multiple parameter sets of TDRA that are used to indicate the time domain resource; and determining one entry of the TDRA set according to the DCI, and determining the preset number of transmission according to the number of parameter set of TDRA in the entry.

The determining of the transmission format of data transmission according to the received DCI and/or the higher layer signaling may comprise at least one of the following determining a TDRA set according to the higher layer signaling, and determining one entry of the TDRA set according to the DCI and the TDRA set, wherein, at least one entry of the TDRA set comprises multiple parameter sets of TDRA; and determining the preset number of transmission according to the indication information indicating the preset number of transmission in the DCI and/or the higher layer signaling.

The performing of the data transmission based on the transmission format of data transmission may comprise at least one of the following: retransmitting all the data corresponding to all parameter set(s) of TDRA for k time(s); when the determined preset number of transmission k is greater than the number of parameter set of the TDRA parameters included in one entry of the determined TDRA set, retransmitting the data corresponding to the partial parameter set(s) of TDRA according to a predefined rule or rule pre-configured by the base station; and when the determined preset number of transmission k is not greater than the number of parameter set of the TDRA included in one entry of the determined TDRA set, transmitting data corresponding to the first k sets of TDRA parameters in TDRA set.

The determining of the transmission format of data transmission according to the received DCI and/or the higher layer signaling may comprise acquiring a candidate set pre-configured by the base station, wherein, the candidate set includes multiple preset combinations, and the preset combination includes at least one of the following: a slot offset, a combination of a start and length indicator SLIV, a start position S and a time domain length L, wherein, each preset combination is provided with a corresponding index; acquiring the indication information transmitted by the base station, wherein, the indication information is used to indicate one of the candidate set corresponding to the preset combination; and determining the transmission format of data transmission based on the candidate set pre-configured by the base station and the indication information transmitted by the base station.

The acquiring of the indication information transmitted by the base station may comprise: acquiring a TDRA set transmitted by the base station, wherein, each entry of the TDRA set includes one or more pieces of indication information.

The indication information may be indicated by the base station using a preset number of bits, and the preset number is $[\log_2(m)]$, wherein, m is the number of preset combinations included in the candidate set.

The determining of the transmission format of data transmission according to the received DCI and/or the higher layer signaling may comprise when it is determined that one entry of the TDRA set includes multiple parameter sets of TDRA, determining a time domain position of a first demodulation signal (DMRS) for the data transmission according to a relative start position of each preset transmission in each parameter set of time domain resource.

The determining of the transmission format of data transmission according to the received DCI and/or the higher layer signaling may comprise at least one of the following determining a fixed modulation scheme according to the received DCI and/or the higher layer signaling, wherein, the fixed modulation scheme is the same modulation scheme adopted by each preset transmission; and determining the modulation scheme adopted by at least one preset transmission according to an actual transmission efficiency and/or a code rate, wherein, the actual transmission efficiency and/or the code rate are acquired by the received DCI and/or the higher layer signaling.

The determining of the transmission format of data transmission according to the received DCI and/or the higher layer signaling may comprise acquiring a modulation and code scheme (MCS) index indicated in the DCI and/or the higher layer signaling; and determining the modulation scheme adopted by the first preset transmission(s) according to the MCS index.

The determining of the modulation scheme adopted by the first preset transmission(s) according to the MCS index may comprise at least one of the following: determining the modulation scheme adopted by the first preset transmission(s) as the modulation scheme corresponding to the MCS index in an MCS index table; and adjusting a modulation order if the code rate corresponding to the MCS index is greater than a preset threshold when used for the first preset transmission, and determining the modulation scheme adopted by the first preset transmission(s) based on the adjusted modulation order.

The determining of the modulation scheme adopted by at least one preset transmission according to the actual transmission efficiency and/or the code rate may comprise determining the transport block size (TBS), wherein the TB is a TB corresponding to the physical uplink shared channel PUSCH or a transport block corresponding to the physical downlink shared channel (PDSCH); and determining a code rate and/or a spectral efficiency adopted by the at least one preset transmission according to at least one of the following: TBS, and the number of symbols actually transmitted by the at least one preset transmission; determining the modulation scheme adopted by the at least one preset transmission according to at least one of the following: the code rate adopted by the at least one preset transmission; the spectral efficiency adopted by the at least one preset transmission; predefined TBS table; a code rate threshold; and a spectrum efficiency threshold.

The determining of the modulation scheme adopted by the at least one preset transmission according to the code rate adopted by the at least one preset transmission and/or the spectral efficiency adopted by the at least one preset transmission as well as a predefined TBS table may comprise determining, in the predefined TBS table, a row which the first code rate and/or the first spectral efficiency are corresponding to, according to the code rate and/or the spectral efficiency adopted by the at least one preset transmission; determining the modulation scheme adopted by the at least one preset transmission according to a modulation order indicated by the row which the first code rate and/or the first spectral efficiency are corresponding to; wherein, the first code rate and/or the first spectral efficiency is: a code rate and/or a spectral efficiency closest to the code rate and/or the spectral efficiency adopted by the at least one preset transmission in a predefined TBS table.

The determining of a transmission format corresponding to the data transmission according to the received DCI and/or the higher layer signaling may comprise at least one of the following determining a time density of the phase tracking reference signal PT-RS corresponding to the preset transmission(s) according to the received DCI and/or the higher layer signaling; determining the time domain locations of the PT-RS corresponding to all the preset transmission(s) or the time domain location of the PT-RS corresponding to any of preset transmission(s) according to the time density of the PT-RS corresponding to the preset transmission(s); and determining the location(s) of the PT-RS time-frequency resource of the PUSCH according to the time density of the PT-RS corresponding to the preset transmission(s) and a time set.

The determining of the time density of the PT-RS corresponding to the preset transmission(s) according to the received DCI and/or the higher layer signaling, may comprise at least one of the following: determining the time density of PT-RS corresponding to the preset transmission(s) according to the MCS index in the MCS table corresponding to an average spectral efficiency corresponding to all the preset transmission(s) and/or an average code rate corresponding to all the preset transmission(s); determining the time density of PT-RS corresponding to the preset transmission(s) by the MCS index scheduled by the DCI or configured by the higher layer signaling; determining the time density of PT-RS corresponding to the preset transmission(s) according to the MCS index in the MCS table corresponding to the actual code rate of any of preset transmission(s) and/or the MCS index in the MCS table corresponding to the actual spectrum efficiency of any preset transmission; determining the time density of PT-RS corresponding to the preset transmission(s) according to the MCS index in the MCS table corresponding to the actual spectrum efficiency of the first preset transmission(s) and/or the MCS index in the MCS table corresponding to the actual code rate of the first preset transmission; determining a time density of PT-RS corresponding to the preset transmission(s) according to a reference signaling density parameter, wherein, the reference signaling density parameter is configured by the base station using the higher layer signaling or the DCI; and determining the time density of PT-RS corresponding to the preset transmission(s) as a preset value.

The determining of the time density of PT-RS corresponding to the preset transmission(s) by the MCS index scheduled by the DCI or configured by the higher layer signaling may comprise acquiring, at least one MCS table and a threshold of time density of at least one PT-RS corresponding to each of MCS tables; determining, MCS table corresponding to the preset transmission(s) from the at least one acquired MCS table; determining, the time density of PT-RS corresponding to the preset transmission(s), according to the MCS index scheduled by the DCI or configured by the higher layer signaling and the determined threshold of time density of the at least one PT-RS corresponding to MCS table.

The determining of the time density of PT-RS corresponding to the preset transmission(s) according to the MCS index in the MCS table corresponding to the average spectral efficiency corresponding to all the preset transmission(s) and/or the MCS index in the MCS table corresponding to the average code rate corresponding to all the preset transmission(s) may comprise searching, in the MCS table, for the MCS index corresponding to the spectral efficiency closest to the average spectral efficiency corresponding to all the preset transmission(s), and/or searching, in the MCS table, for the MCS index corresponding to the code rate closest to the average code rate corresponding to all the preset transmission(s); determining a time density of PT-RS corresponding to the preset transmission(s) according to the found MCS index and the threshold value configured by the base station; determining the time density of PT-RS corresponding to the preset transmission(s) by the MCS index scheduled by the configured by the RRC, including: determining the time density of PT-RS corresponding to the preset transmission(s) by the MCS index scheduled by the configured by the RRC and the threshold value configured by the base station; determining the time domain of PT-RS corresponding to the preset transmission(s) according to the MCS index in the MCS table corresponding to the actual code rate and/or the MCS index in the MCS table corresponding to the actual spectrum efficiency of any preset transmission, including: searching, in the MCS table, for the MCS index corresponding to the code rate closest to the actual code rate of the any of the preset transmission(s) and/or searching, in the MCS table, for the MCS index corresponding to the spectral efficiency closest to the actual spectral efficiency of the any of the preset transmission; determining a time density of the PT-RS corresponding to the preset transmission(s) according to the found MCS index and the threshold value configured by the base station; determining the time density of PT-RS corresponding to the preset transmission(s) according to the MCS index in the MCS table corresponding to the actual spectrum efficiency of the first preset transmission(s) and/or the MCS index in the MCS table corresponding to the actual code rate of the first preset transmission, including: searching for the MCS index in the MCS table corresponding to the code rate closest to the actual code rate of the first preset transmission(s) and/or searching for the MCS index in the MCS table corresponding to the spectral efficiency closest to the actual spectrum efficiency of the first preset transmission; determining the time density of PT-RS corresponding to the preset transmission(s) according to the found MCS index and the threshold value configured by the base station.

The determining of a time domain position of the PT-RS in all preset transmission(s) or a time domain position of the PT-RS in any of preset transmission(s) according to the time density of the PT-RS corresponding to the preset transmission(s), may comprise determining the time domain position of the PT-RS in all preset transmission(s) according to the time density of the PT-RS corresponding to the reset transmission and the start symbol of the first preset transmission(s); or determining the time domain position of the PT-RS in any of the preset transmission(s) according to the time density of the PT-RS corresponding to the preset transmission(s) and the start symbol occupied by the any of the preset transmission(s).

The time set may comprise at least one of the following: the start position of the TDRA of PUSCH of any of multiple preset transmission(s)s or the start position of the first preset transmission(s), or the start position of the continuous symbol set and/or the slot of the start position in all PUSCH preset transmission(s); the PUSCH time domain resource of any of multiple preset transmission(s) or the PUSCH time domain resource of any preset transmission(s), or the time domain resource of all preset transmission(s) actually transmitted by PUSCH.

In an exemplary embodiment, the method may further comprise determining that the transmission format processing manner for determining the transmission belongs to a first resource processing manner or a second resource processing manner according to the indication information of the DCI, and the resource processing manner includes: a resource allocation manner and/or a resource mapping manner.

The determining that the resource processing manner configured by the base station belongs to a first resource processing manner or a second resource processing manner according to the indication information of the DCI may comprise determining that the resource processing manner configured by the base station belongs to the first resource processing manner or the second resource processing manner according to the index of the row indicated in the TDRA table; and/or, determining the resource processing manner configured by the base station belongs to the first resource processing manner or the second resource processing manner according to at least one of the following: a specific field added in the DCI; an indication value provided in the preset domain; DCI format; RNTI for scrambling; a search space; and DCI load size and control channel resource set.

The determining the transmission format of data transmission according to the received DCI and/or the higher layer signaling may comprise at least one of the following: determining a potential resource set not for data mapping according to the configuration information in the higher layer signaling, and determining resource set not for resource set not for a data mapping according to the indication information in the DCI for indicating the data channel transmission; determining a resource not for data mapping according to the configuration information in the higher layer signaling; and determining a potential resource not for data mapping by the configuration information in the higher layer signaling, and determining the resource not for data mapping according to the group common DCI.

In an exemplary embodiment, a user equipment (UE) is provided, comprising: a receiving module configured to receive downlink control information DCI and/or higher layer signaling transmitted by a base station; a first determining module configured to determine a transmission format of the data transmission according to the DCI and/or the higher layer signaling received by the receiving module, wherein, the transmission format includes at least one of the following: a time domain resource, a frequency domain resource, a preset number of transmission, a modulation scheme, a resource location for reference signal and a transport block size, and wherein, the preset number of transmission includes: a number of transmission and/or a number of repetition; and a first data transmission module configured to perform the data transmission based on the transmission format of data transmission determined by the first determining module.

The first determining module may be configured to determine a TDRA set according to the higher layer signaling, wherein, at least one entry of TDRA set includes multiple parameter sets of TDRA that are used to indicate the time domain resource; and the first determining module is further configured to determine one entry of the TDRA set according to the DCI, and determine the preset number of transmission according to the number of parameter set of TDRA in the entry.

The first determining module may be configured to determine a TDRA set according to the higher layer signaling, and determine one entry of the TDRA set according to the DCI and TDRA set, wherein, at least one of the TDRA set comprises multiple parameter sets of TDRA; and/or the first determining module is specifically configured to determine the preset number of transmission according to the indication information indicating the preset number of transmission in the DCI and/or the higher layer signaling.

The first data transmission module may be specifically configured to retransmit all the data corresponding to all parameter set(s) of TDRA for k time(s); and/or the first data transmission module is specifically configured to: when the determined preset number of transmission k is greater than the number of parameter set of the TDRA included in one entry of the determined TDRA set, retransmitting the data corresponding to the partial parameter set(s) of TDRA according to a predefined rule or rule pre-configured by the base station; and/or the first data transmission module is specifically configured to: when the determined preset number of transmission k is not greater than the number of parameter set of the TDRA included in one entry of the determined TDRA set, transmitting data corresponding to the first k sets of TDRA parameters in TDRA set.

The first determining module may comprise: a first acquiring unit, a second acquiring unit and a first determining unit, wherein, the first acquiring unit is configured to acquire a candidate set pre-configured by the base station, wherein, the candidate set includes multiple preset combinations, and the preset combination includes at least one of the following: a slot offset, a combination of a start and length indicator SLIV, a start position S and a time domain length L, wherein, each preset combination is provided with a corresponding index; the second acquiring unit is configured to acquire the indication information transmitted by the base station, wherein, the indication information is used to indicate one of the indexes corresponding to the preset combination; the first determining unit is configured to determine the transmission format of data transmission based on the candidate set pre-configured by the base station and acquired by the first acquiring unit as well as the TDRA set transmitted by the base station and acquired by the second acquiring unit.

The second acquiring unit may be configured to acquire the TDRA set transmitted by the base station, wherein, each entry of the TDRA set includes one or more pieces of indication information.

The first determining module may be configured to when it is determined that one entry of the TDRA set includes multiple sets of time domain resource parameters, determining a time domain position of a first demodulation signal (DMRS) for the data transmission according to a relative start position of each preset transmission in each parameter set of time domain resource.

The first determining module may be configured to determine a fixed modulation scheme according to the received DCI and/or the higher layer signaling, wherein, the fixed modulation scheme is a modulation scheme adopted by each preset transmission; and/or the first determining module is further specifically configured to determine the modulation scheme adopted by at least one preset transmission according to an actual transmission efficiency and/or a code rate, wherein, the actual transmission efficiency and/or the code rate are acquired by the received DCI and/or the higher layer signaling.

The first determining module may comprise a third acquiring unit and a second determining unit, wherein, the third acquiring unit is configured to acquire a modulation and code scheme (MCS) index indicated in the DCI and/or the higher layer signaling; and the second determining unit is configured to determine the modulation scheme adopted by the first preset transmission(s) according to the MCS index acquired by the third acquiring unit.

The second determining unit may be configured to determine the modulation scheme adopted by the first preset transmission(s) as the modulation scheme corresponding to the MCS index in a MCS index table; and/or the second determining unit is further specifically configured to adjust a modulation order if the code rate corresponding to the MCS index is greater than the preset threshold when used for the first preset transmission(s), and determining the modulation scheme adopted by the first preset transmission(s) based on the adjusted modulation order.

The first determining module may be configured to determine the transport block size (TBS), wherein, the TB is a TB corresponding to the PUSCH or a TB corresponding to the PDSCH, the first determining module is further specifically configured to determine a code rate and/or a spectral efficiency adopted by the at least one preset transmission according to at least one of the following: TBS, and the number of symbols actually transmitted by the at least one preset transmission; determining the modulation scheme adopted by the at least one preset transmission according to at least one of the following: the code rate adopted by the at least one preset transmission; the spectral efficiency adopted by the at least one preset transmission; predefined TBS table; code rate threshold; and spectrum efficiency threshold.

The first determining module may be further specifically configured to determine, in the predefined TBS table, a row which the first code rate and/or the first spectral efficiency are corresponding to, according to the code rate and/or the spectral efficiency adopted by the at least one preset transmission; the first determining module is further specifically configured to determine an modulation scheme adopted by the at least one preset transmission according to a modulation order indicated by the row which the first code rate and/or the first spectral efficiency are corresponding to; wherein, the first code rate and/or the first spectral efficiency is: a code rate and/or a spectral efficiency closest to the code rate and/or the spectral efficiency adopted by the at least one preset transmission in a predefined TBS table.

The first determining module may be configured to determine a time density of the PT-RS corresponding to the preset transmission according(s) to the received DCI and/or the higher layer signaling; and/or the first determining module is specifically configured to determine the time domain locations of the PT-RS corresponding to all the preset transmission(s) or the time domain location of the PT-RS corresponding to any of preset transmission(s) according to the time density of the PT-RS corresponding to the preset transmission(s); and/or the first determining module is specifically configured to determine the location(s) of the PT-RS time frequency resource of the PUSCH according to the time density of the PT-RS corresponding to the preset transmission(s) and a time set.

The first determining module may be configured to determine the time density of PT-RS corresponding to the preset transmission(s) according to the MCS index in the MCS table corresponding to the average spectral efficiency corresponding to all the preset transmission(s) and/or the average code rate corresponding to all the preset transmission(s); and/or the first determining module is specifically configured to determine the time density of the PT-RS corresponding to the preset transmission(s) by the MCS index scheduled by the DCI or configured by the higher layer signaling; and/or the first determining module is specifically configured to determine the time density of the PT-RS corresponding to the preset transmission(s) according to the MCS index in the MCS table corresponding to the actual code rate of any of preset transmission(s) and/or the MCS index in the MCS table corresponding to the actual spectrum efficiency of any of preset transmission(s); and/or the first determining module is specifically configured to determine the time density of the PT-RS corresponding to the preset transmission(s) according to the MCS index in the MCS table corresponding to the actual spectrum efficiency of the first preset transmission(s) and/or the MCS index in the MCS table corresponding to the actual code rate of the first preset transmission(s); and/or the first determining module is specifically configured to determine a time density of the PT-RS corresponding to the preset transmission(s) according to a reference signaling density parameter, wherein, the reference signaling density parameter is configured by the base station using the higher layer signaling or DCI; and/or the first determining module is specifically configured to determine the time density of the PT-RS corresponding to the preset transmission(s) as a preset value.

Upon determining the time density of PT-RS corresponding to the preset transmission(s) by the MCS index scheduled by the DCI or configured by the higher layer signaling, the first determining module may be configured to acquire, at least one MCS table and a threshold of time density of at least one PT-RS corresponding to each of MCS tables; determine, MCS table corresponding to the preset transmission(s) from the at least one acquired MCS table; determine, the time density of PT-RS corresponding to the preset transmission(s), according to the MCS index scheduled by the DCI or configured by the higher layer signaling and the determined threshold of time density of the at least one PT-RS corresponding to MCS table.

The time set may comprise at least one of the following: the start position of the TDRA of PUSCH of any of multiple preset transmission(s) or the start position of the first preset transmission(s), or the start position of the continuous symbol set and/or the slot of the start position in all PUSCH preset transmission(s); the PUSCH time domain resource of any of multiple preset transmission(s) or the PUSCH time domain resource of any of preset transmission(s), or the time domain resource of all preset transmission(s) actually transmitted by PUSCH.

The first determining module may be configured to determine a potential resource set not for data mapping according to the configuration information in the higher layer signaling, and determine resource set not for a data mapping according to the indication information in the DCI for indicating the data channel transmission; and/or the first determining module is specifically configured to determine resource set not for a data mapping set according to the configuration information in the higher layer signaling; and/or the first determining module is specifically configured to determine the potential resource set not for data mapping by the configuration information in the higher layer signaling, and determine the data mapping avoidance resource according to the group common DCI.

In an exemplary embodiment, a user equipment (UE) is provided, comprising: one or more processors; a memory; one or more application programs stored in a memory and configured to be executed by one or more processors, wherein, the one or more programs are configured to: perform the method of data transmission according to certain embodiments according to this disclosure.

In an exemplary embodiment, a computer readable storage medium is provided. The computer readable storage medium stores a computer program thereon, and when executed by the processor, causes the processor to perform the method of data transmission according to certain embodiments according to this disclosure.

In an exemplary embodiment, a method of data transmission is provided, which is performed by a base station, comprising: determining a transmission format of data transmission; transmitting the transmission format of data transmission by the DCI and/or the higher layer signaling; performing the data transmission based on the transmission format of data transmission.

In an exemplary embodiment, a base station is provided, comprising: a second determining module configured to determine a transmission format of data transmission; a transmission module configured to transmit the transmission format of data transmission by the DCI and/or the higher layer signaling; and a second data transmission module configured to perform the data transmission based on the transmission format of data transmission.

In an exemplary embodiment, a base station is provided, comprising: one or more processors; a memory; one or more application programs stored in a memory and configured to be executed by one or more processors, wherein, the one or more programs are configured to: perform the method of data transmission according to certain embodiments according to this disclosure.

In an exemplary embodiment, a computer readable storage medium is provided. The computer readable storage medium stores a computer program thereon, and when executed by the processor, causes the processor to perform the method of data transmission according to certain embodiments according to this disclosure.

In an exemplary embodiment, a method of performing data transmission, the method performed by a user equipment (UE) and comprising: receiving at least one of downlink control information (DCI) or higher layer signaling from a base station; determining a transmission format of the data transmission based on at least one of the DCI or the higher layer signaling; and performing the data transmission based on the determined transmission format, wherein the transmission format comprises at least one of a time domain resource, a frequency domain resource, a modulation scheme, a resource location for a reference signal, a transport block size, the number of repetitions or the number of transmissions.

The determining of the transmission format of the data transmission based on the DCI or the higher layer signaling may comprise: determining a time domain resource allocation (TDRA) set based on the higher layer signaling; determining an entry of the TDRA set according to the DCI; and determining the number of transmissions based on the number of parameter sets of the determined entry of the TDRA set.

A parameter set of the entry of the TDRA set may comprise at least one of a Start symbol and Length Indicator Value (SLIV) and a mapping type.

The number of transmissions may be determined based on the number of SLIVs of the determined entry of the TDRA set.

The entry of TDRA set may comprise at least two parameter sets and each of the parameter sets corresponds to the time domain resource.

The determining of the transmission format of the data transmission based on the DCI or the higher layer signaling may comprise determining a time domain resource allocation (TDRA) set according to the higher layer signaling; determining an entry of the TDRA set according to the DCI; and determining the number of repetitions according to the number of parameter sets of the determined entry of the TDRA set.

The method may further comprise determining a TDRA mapping method based on a format of the DCI received from the base station.

The performing of the data transmission based on the determined transmission format may comprise determining at least one resource to be bypassed; and performing the data transmission based on the determined transmission format and the at least one resource to be bypassed, wherein the at least one resource to be bypassed comprises at least one of a resource not for data mapping as indicated by Radio Resource Control (RRC) or a resource that needs data mapping avoidance dynamically indicated by the DCI.

In an exemplary embodiment, a method of performing data transmission, the method performed by a base station and comprising: determining a transmission format of data transmission; transmitting information regarding the transmission format of the data transmission, based on at least one of downlink control information (DCI) or higher layer signaling; and performing the data transmission based on the determined transmission format, wherein the transmission format comprises at least one of a time domain resource, a frequency domain resource, a modulation scheme, a resource location for reference signal, a transport block size, the number of repetitions or the number of transmissions.

The method may further comprise determining a TDRA mapping method; and transmitting a DCI having a format of the DCI corresponding to the determined TDRA mapping method received from the base station.

In an exemplary embodiment, a user equipment (UE) for performing data transmission, the UE comprising: a transceiver; at least one processor coupled to the transceiver and configured to: receive at least one of downlink control information (DCI) or higher layer signaling from a base station, determine the transmission format of the data transmission based on at least one of the DCI or the higher layer signaling, and perform the data transmission based on the determined transmission format, wherein the transmission format comprises at least one of a time domain resource, a frequency domain resource, a modulation scheme, a resource location for reference signal, a transport block size, the number of repetitions or the number of transmissions.

The processor may be further configured to: determine a time domain resource allocation (TDRA) set based on the higher layer signaling, determine an entry of the TDRA set according to the DCI, and determine the number of transmissions based on the number of parameter sets of the determined entry of the TDRA set.

A parameter set of the entry of the TDRA set may comprise at least one of a Start symbol and Length Indicator Value (SLIV) and a mapping type.

The number of transmissions may be determined based on the number of SLIVs of the determined entry of the TDRA set.

The entry of TDRA set may comprise at least two parameter sets and each of the parameter sets corresponds to the time domain resource.

The processor may be further configured to: determine a time domain resource allocation (TDRA) set according to the higher layer signaling; determine an entry of the TDRA set according to the DCI; and determine the number of repetitions according to the number of parameter sets of the determined entry of the TDRA set.

The processor may be further configured to: determine a TDRA mapping method based on a format of the DCI received from the base station.

The processor may be further configured to: determine at least one resource to be bypassed; and perform the data transmission based on the determined transmission format and the at least one resource to be bypassed, wherein the at least one resource to be bypassed comprises at least one of a resource not for data mapping as indicated by Radio Resource Control (RRC) or a resource that needs data mapping avoidance dynamically indicated by the DCI.

In an exemplary embodiment, a base station for performing data transmission, the base station comprising: a transceiver; at least one processor coupled to the transceiver and configured to: determine a transmission format of data transmission, transmit information regarding the transmission format of the data transmission, based on at least one of downlink control information (DCI) or higher layer signaling, and perform the data transmission based on the determined transmission format, wherein the transmission format comprises at least one of a time domain resource, a frequency domain resource, a modulation scheme, a resource location for reference signal, a transport block size, the number of repetitions or the number of transmissions.

The processor may be further configured to: determine a TDRA mapping method; and transmit a DCI having a format of the DCI corresponding to the determined TDRA mapping method determine a TDRA mapping method based on a format of the DCI received from the base station.

Certain embodiments according to the present application provide the following technical effects:

The present application provides a user equipment and a method of data transmission. In various embodiments, the method of data transmission in the present application comprises: receiving DCI and/or higher layer signaling transmitted by a base station; determining a transmission format of the data transmission according to the received DCI and/or the higher layer signaling, wherein, the transmission format includes at least one of the following: a time domain resource, a frequency domain resource, a preset number of transmission, a modulation scheme, a resource location for reference signal and a transport block size, and wherein, the preset number of transmission includes: a number of transmission and/or a number of repetition; and performing the data transmission based on the transmission format of data transmission. That is, the UE may receive the transmission format of data transmission configured by the base station, including at least one of the following: a time domain resource, a frequency domain resource, a preset number of transmission, a modulation scheme, a resource location for reference signal and a transport block size, and perform the data transmission according to the transmission format received from the base station, thereby solving the problem that the transmission format such as the modulation scheme, the reference signal, the resource position in each preset transmission is difficult to be determined due to the different lengths of the symbols used in each actual preset transmission.

The present application provides a base station and a method of data transmission. In certain embodiments, the method of data transmission in the present application comprises: determining a transmission format of data transmission; transmitting the transmission format of data transmission by the DCI and/or the higher layer signaling; performing the data transmission based on the transmission format of data transmission. That is, when the base station determines the transmission format of data transmission, the determined transmission format of data transmission may be transmitted to UE by the DCI and/or the higher layer signaling, such that UE acquires the transmission format required by the data transmission, and the data transmission is performed after acquiring the transmission format, to solve the problem that the transmission format such as the modulation scheme, the reference signal, the resource position in each preset transmission is difficult to be determined due to the different lengths of the symbols used in each actual preset transmission.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In order to more clearly illustrate the technical solutions in the embodiments of the present application, the drawings used in the description of the embodiments of the present application will be briefly described below.

DETAILED DESCRIPTION

Figure 1:
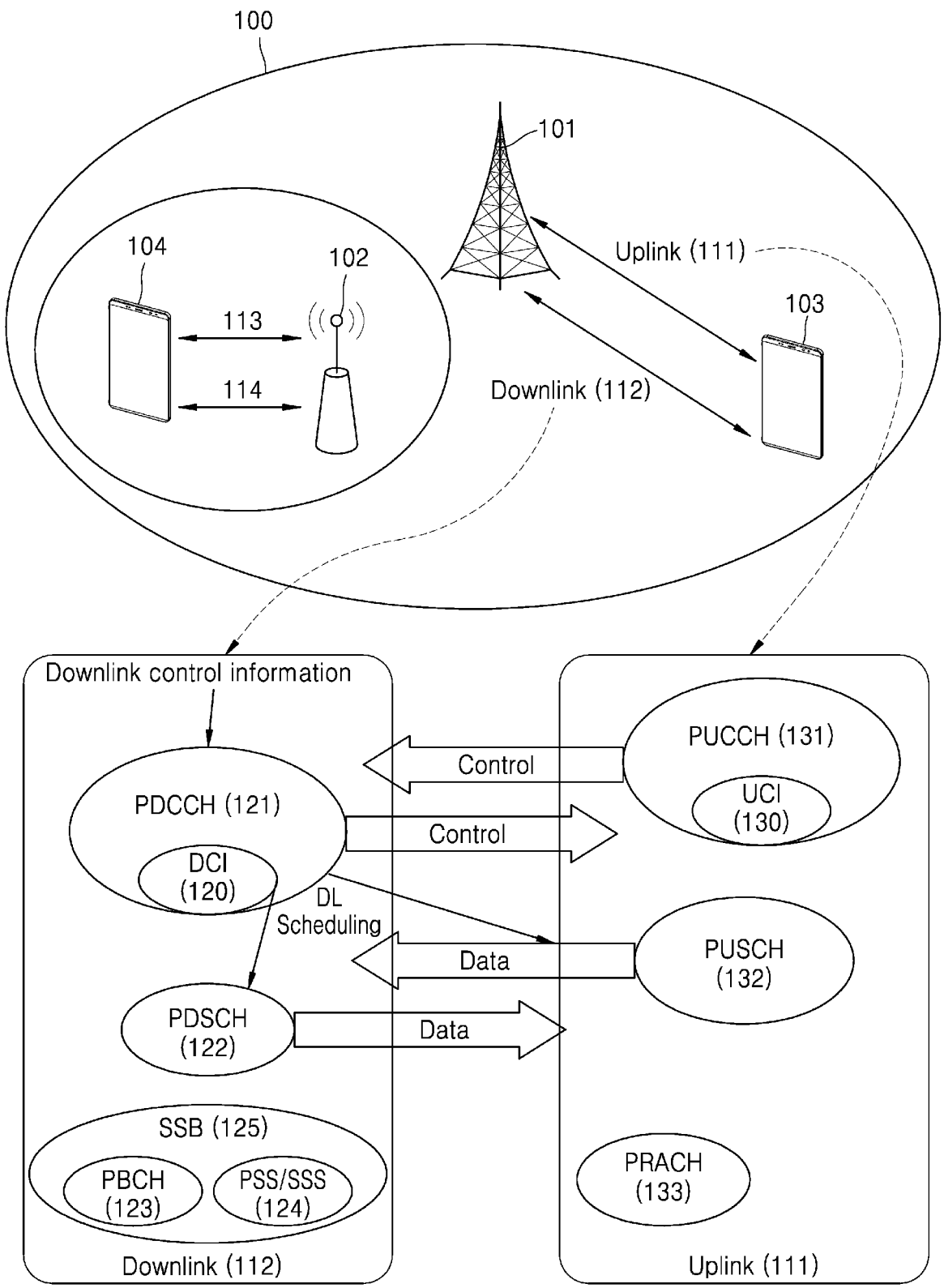
FIG. 1 illustrates an example of a wireless communication system according to certain embodiments of the present application.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "processor" or "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances, such definitions apply to prior as well as future uses of such defined words and phrases.

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed entries or combinations thereof.

In order to make the objects, technical solutions and advantages of the present application more clear, the embodiments of the present application will be further described in detail below with reference to the drawings.

FIG. 1 illustrates an example of a wireless communication system 100 according to certain embodiments of the present application, wherein, the wireless communication system 100 includes one or more fixed infrastructure units that form a network distributed over a geographic area. The infrastructure unit may include an AP (Access Point), an AT (Access Terminal), a BS (Base Station), a Node-B (Node B), an eNB (evolved NodeB, an evolved base station), and a gNB (Next generation base station) and so on.

Referring to the non-limiting example of FIG. 1, an infrastructure unit 101 and an infrastructure unit 102 (for example, a base station) may provide services for a number of MSs (mobile stations) or UEs or terminal devices or user equipments 103 and user equipments 104 in a service area. The service area is a cell or within a sector range of the cell. In some systems, one or more BSs are communicatively coupled to a controller forming an access network, the controller is communicatively coupled to one or more core networks. This example is not limited to any particular wireless communication system.

In the time domain and/or frequency domain, the infrastructure unit 101 and the infrastructure unit 102 may transmit Downlink (DL) communication signal 112 and DL communication signal 113 to the MS or the user equipment (UE) 103 and the UE 104, respectively. The MS or UE 103 may communicate with the infrastructure unit (for example, a base station) 101 via Uplink (UL) communication signals 111 and 114, and the MS or UE 104 communicates with the infrastructure unit 102 via the UL communication signal 114.

In one embodiment, the mobile communication system 100 may be an OFDM (Orthogonal Frequency Division Multiplexing)/OFDMA (Orthogonal Frequency Division Multiple Access) including multiple base stations and multiple UEs. A plurality of base stations includes a base station 101 and a base station 102, and a plurality of UEs includes a UE 103 and a UE 104. Base station 101 communicates with UE 103 via UL communication signal 111 and DL communication signal 112.

When a base station has a downlink packet to be transmitted to the UE, each UE may obtain a downlink allocation (resource), such as a group of radio resources in a Physical Downlink Shared Channel (PDSCH). When the UE needs to send a packet to the base station in the uplink, the UE obtains the grant from the base station, wherein, the grant allocation includes a Physical Uplink Shared Channel (PUSCH) of the uplink radio resource. The UE may acquire downlink scheduling information or uplink scheduling information from a Physical Downlink Control Channel (PDCCH) dedicated to itself. The downlink information (including downlink scheduling information and other control information) or uplink information (including uplink scheduling information and other control information) carried by the PDCCH may be called Downlink Control Information (DCI).

The non-limiting example of FIG. 1 also shows different physical channels for a downlink 112 and an uplink 111 examples. In certain embodiments, downlink 112 includes a PDCCH 121, a PDSCH 122, a Physical Broadcast Channel (PBCH) 123, and a Primary Synchronization Signal (PSS)/Secondary Synchronization Signal (SSS) 124. In certain embodiments, in the 5G NR, the PSS, the SSS and the PBCH together constitute one SSB (SS/PBCH block) 125. The PDCCH 121 may transmit a DCI 120 to the UE, that is, the DCI 120 may be carried by the PDCCH 121. The PDSCH 122 may transmit downlink data information to the UE. The PBCH may carry a Master Information Block (MIB) for early UE discovery and cell-wide coverage. The uplink 111 may include a Physical Uplink Control Channel (PUCCH) 131 carrying Uplink Control Information (UCI) 130, a PUSCH 132 carrying uplink data information, and a Physical Random Access Channel (PRACH) 133 carrying random access information.

In addition to the traditional cellular networking mode, certain embodiments according to the present application are also applicable to a resource allocation method for sidelink transmission. As used in this disclosure, sidelink transmission encompasses to communication between terminals.

In at least one embodiment, the wireless communication system 100 may use an OFDMA or a multi-carrier architecture, including Adaptive Modulation and Coding (AMC) on the downlink and a next-generation single-carrier FDMA architecture for UL transmission or a multi-carrier OFDMA architecture for UL transmission. FDMA-based single carrier architecture may include at least one of following: Interleaved FDMA (IFDMA), Localized FDMA (LFDMA), IFDMA, or DFT-spread OFDM (DFT-SOFDM, extended discrete Fourier transform) of the LFDMA. In addition, various enhanced non-orthogonal multiple access (NOMA) architectures of the OFDMA system are also included.

Exemplary OFDMA protocols may include the developed LTE and 5G NR in the 3GPP UMTS standard, as well as the IEEE 802.16 and a series of standards in the IEEE standard. The architecture may also include the use of transmission technologies, such as multi-carrier CDMA (MC-CDMA), multi-carrier direct sequence CDMA (MC-DS-CDMA), Orthogonal Frequency and Code Division Multiplexing (OFCDM). Alternatively, simpler time division multiplexing and/or frequency division multiplexing multiple access techniques, or any combination of these techniques, may be employed. In one exemplary embodiment, the communication system may use other cellular communication system protocols, including, but not limited to, Time Division Multiple Access (TDMA) or Code Division Multiple Access (Direct Sequence CDMA).

In the NR system, the transmission format of the uplink data channel and the transmission format of the downlink data channel (such as time domain resources, frequency domain resources, a preset number of transmission, modulation scheme, transport block size, etc.) may be indicated (such as Type 1 uplink configuration grant (GC)) by the DCI or higher layer signaling (for example, Radio Resource Control (RRC), wherein, some parameters of Type 2 uplink configuration grant and downlink semi-persistent scheduling (SPS) are indicated by activating the DCI. The transmission format of the uplink data channel and the transmission format of the downlink data channel for the dynamic grant are respectively indicated by the DCI formats indicating the uplink data channel and the downlink data channel. In the embodiments of the present application, one or more parameters of the transmission format of the data channel may be indicated by the DCI or RRC.

The technical solutions of the present application and how the technical solutions of the present application solve the above technical problems are described in detail with reference to the following illustrative embodiments. The following illustrative embodiments may be combined with each other, and the same or similar concepts or processes may not be described in some embodiments. Certain embodiments of the present application will be described below with reference to the drawings.

Figure 2A:
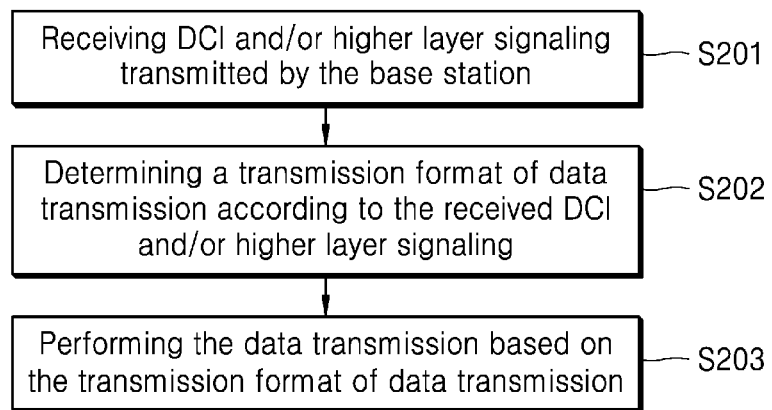
FIG. 2A illustrates operations of an example of a method of data transmission according to certain embodiments of the present application.
Figure 2B:
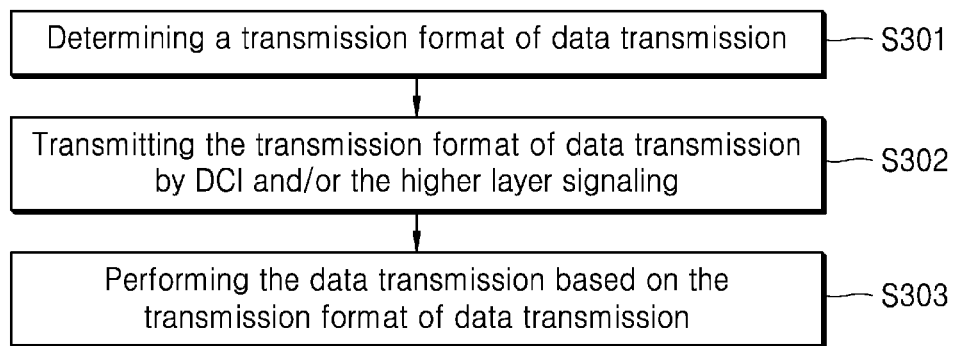
FIG. 2B illustrates operations of an example of a method of data transmission according to certain embodiments of the present application.

Certain embodiments according to the present application provide a method of data transmission, and in particular, provide a transmission method for performing preset transmission, such as shown in the example of FIG. 2A, which includes:

Step S201: receiving DCI and/or higher layer signaling transmitted by the base station.

Step S202: determining a transmission format of the data transmission according to the received DCI and/or higher layer signaling.

In certain embodiments, the transmission format includes at least one of the following: a time domain resource, a frequency domain resource, a preset number of transmission, a modulation scheme, a resource location for reference signal, and a transport block size, wherein, the preset number of transmission includes: a number of transmission and/or a number of repetition; and Step S203: performing the data transmission based on the transmission format of data transmission.

In at least one exemplary embodiment, the foregoing steps S201, S202, and S203 are not limited to the execution sequence shown in FIG. 2A, and any possible execution sequence is within the protection scope of the present application.

In various embodiments, the step S202 may specifically include: step S2021 (not shown) and step S2022 (not shown), in which, In various embodiments, at Step S2021 a TDRA set according to the higher layer signaling, wherein, at least one entry of TDRA set includes multiple parameter sets of TDRA that are used to indicate the time domain resource is determined.

In certain embodiments, at Step S2022 one entry of the TDRA set according to the DCI, and determining the preset number of transmission according to the number of parameter set of TDRA in the entry is determined.

In some embodiments, step S203 may include at least one of following: step S2031a (not shown), step S2031b (not shown), and step S2032 (not shown), wherein, In certain embodiments, at Step S2031a, data corresponding to all sets of TDRA parameters for k times is retransmitted;

In various embodiments, at Step S2031b: when the determined preset number of transmission k is greater than the number of parameter set of the TDRA included in one entry of the determined TDRA set, data corresponding to the partial sets of TDRA parameters according to a predefined rule or rule pre-configured by the base station is retransmitted.

Is some embodiments, at Step S2032, when the determined preset number of transmission k is not greater than the number of parameter set of the TDRA included in one entry of the determined TDRA set, data corresponding to the first k sets of TDRA parameters in TDRA set is retransmitted.

In at least one exemplary embodiment, the step S202 may include: at least one of step S2023 (not shown) and step S2024 (not shown), in which, In various embodiments, at Step S2023 a TDRA set according to the higher layer signaling is determined, and one entry of the TDRA set according to the DCI and TDRA set is determined.

In some embodiments, at least one entry of the TDRA set comprises multiple parameter sets of TDRA.

At Step S2024 the preset number of transmissions according to the indication information indicating the preset number of transmission in the DCI and/or the higher layer signaling is determined.

In certain embodiments, step S202 may include: step S2025 (not shown), step S2026 (not shown), and step S2027 (not shown.

According to various embodiments, at Step S2025, a candidate set pre-configured by the base station is acquired.

In certain embodiments, the candidate set includes multiple preset combinations, and the preset combination includes at least one of the following: a slot offset, a combination of a start and length indicator SLIV, a start position S and a time domain length L, wherein, each preset combination is provided with a corresponding index.

In some embodiments, at Step S2026, the indication information transmitted by the base station is acquired.

In certain embodiments, the indication information is used to indicate one of the indexes corresponding to the preset combination;

According to certain embodiments, acquiring the indication information transmitted by the base station, comprises: acquiring a TDRA set transmitted by the base station.

In certain embodiments, each entry of the TDRA set includes one or more pieces of indication information; and At Step S2027 the transmission format of data transmission based on the candidate set pre-configured by the base station and the indication information transmitted by the base station is determined.

In an exemplary embodiment, the step S202 may include: step S2028 (not shown).

At Step S2028, it is determined that one entry of the TDRA set includes multiple sets of time domain resource parameters, determining a time domain position of a first demodulation signal (DMRS) for the data transmission according to a relative start position of each preset transmission in each parameter set of time domain resource.

In an exemplary embodiment, the step S202 may include: at least one of step S2029 (not shown) and step 202a (not shown), wherein, According to some embodiments, at Step S2029, a fixed modulation scheme according to the received DCI and/or the higher layer signaling is determined.

In certain embodiments, the fixed modulation scheme is a modulation scheme adopted by each preset transmission.

At Step S202a the modulation scheme adopted by at least one preset transmission according to an actual transmission efficiency and/or a code rate is determined.

In certain embodiments, the actual transmission efficiency and/or the code rate are acquired by the received DCI and/or the higher layer signaling.

In an exemplary embodiment, step S202 may include: step S202b (not shown) and step S202c (not shown).

In various embodiments, at Step S202b, a modulation and code scheme (MCS) index indicated in the DCI and/or the higher layer signaling is acquired.

In at least one embodiment, at Step S202c, the modulation scheme adopted by the first preset transmission(s) according to the MCS index is determined.

In an exemplary embodiment, the step S202c may include: determining the modulation scheme adopted by the first preset transmission(s) includes: determining the modulation scheme adopted by the first preset transmission(s) as the modulation scheme corresponding to the MCS index in a MCS index table; and/or adjusting a modulation order if the code rate corresponding to the MCS index is greater than the preset threshold when used for the first preset transmission(s), and determining the modulation scheme adopted by the first preset transmission(s) based on the adjusted modulation order.

In an exemplary embodiment, step S202a may include: step S202a1 (not shown), step S202a2 (not shown), and step S202a3 (not shown).

In some embodiments, at Step S202a1, the TBS, wherein, the TB is a TB corresponding to the PUSCH or a TB corresponding to the PDSCH, is determined.

At Step S202a2 a code rate and/or a spectral efficiency adopted by the at least one preset transmission according to at least one of the following is determined:

TBS, or the number of symbols actually transmitted by the at least one preset transmission.

According to various embodiments, at Step S202a3, the modulation scheme adopted by the at least one preset transmission is determined according to at least one of the following:

The code rate adopted by the at least one preset transmission, the spectral efficiency adopted by the at least one preset transmission, predefined TBS table, code rate threshold and spectrum efficiency threshold.

In an exemplary embodiment, determining the modulation scheme adopted by the at least one preset transmission according to the code rate adopted by the at least one preset transmission and/or the spectral efficiency adopted by the at least one preset transmission as well as the predefined TBS table, comprises: determining, in the predefined TBS table, a row which the first code rate and/or the first spectral efficiency are corresponding to according to the code rate and/or the spectral efficiency adopted by the at least one preset transmission; and determining a modulation scheme adopted by the at least one preset transmission according to a modulation order indicated by the row which the first code rate and/or the first spectral efficiency are corresponding to.

In various embodiments, the first code rate and/or the first spectral efficiency is: a code rate and/or a spectral efficiency closest to the code rate and/or the spectral efficiency adopted by the at least one preset transmission in a predefined TBS table.

In an exemplary embodiment, step S202 may include at least one of following: step S202d (not shown), step S202e (not shown), and step S202f (not shown).

In some embodiments, at step S202d: a time density of the phase tracking reference signal (PT-RS) corresponding to the preset transmission(s) according to the received DCI and/or the higher layer signaling is determined.

In some embodiments, at Step S202e the time domain locations of the PT-RS corresponding to all the preset transmission(s) or the time domain location of the PT-RS corresponding to any of preset transmission(s) according to the time density of the PT-RS corresponding to the preset transmission(s) are determined.

At Step S202f the location(s) of the time-frequency resource of the PT-RS of the PUSCH according to the time density of the PT-RS corresponding to the preset transmission(s) and a time set are determined.

In certain embodiments, the time set comprises: the start position of the TDRA of PUSCH of any of multiple preset transmission(s) or the start position of the first preset transmission(s), or the start position of the continuous symbol set and/or the slot of the start position of in all PUSCH preset transmission(s); and/or the time domain resource of PUSCH of any of multiple preset transmission(s) or the time domain resource of PUSCH of any of preset transmission(s), or the time domain resource of all preset transmission(s) actually transmitted by PUSCH.

The above method (such as S202d, S202e, S202f) is also applicable to PT-RS in PDSCH.

Specifically, Step S202d may include: Step S202d1 (not shown), Step S202d2 (not shown), Step S202d3 (not shown), Step S202d4 (not shown), Step S202d5 (not shown) and Step S202d6 (not shown).

In some embodiments, at Step S202d1, the time density of PT-RS corresponding to the preset transmission(s) according to the MCS index in the MCS table corresponding to the average spectral efficiency corresponding to all the preset transmission(s) and/or the average code rate corresponding to all the preset transmission(s) is determined.

At Step S202d2, the time density of PT-RS corresponding to the preset transmission(s) by the MCS index scheduled by the DCI or configured by the higher layer signaling is determined.

At Step S202d3, the time density of PT-RS corresponding to the preset transmission(s) according to the MCS index in the MCS table corresponding to the actual code rate of any of preset transmission(s) and/or the MCS index in the MCS table corresponding to the actual spectrum efficiency of any of preset transmission(s) is determined.

At Step S202d4 the time density of PT-RS corresponding to the preset transmission(s) according to the MCS index in the MCS table corresponding to the actual spectrum effi-
ciency of the first preset transmission(s) and/or the MCS index in the MCS table corresponding to the actual code rate of the first preset transmission(s).

Step S202d5 comprises determining a time density of PT-RS corresponding to the preset transmission(s) according to a reference signaling density parameter, wherein, the reference signaling density parameter is configured by the base station using the higher layer signaling or DCI.

According to various embodiments, at Step S202d6: determining the time density of PT-RS corresponding to the preset transmission(s) as a preset value is determined.

Specifically, step S202d2 may further comprise: acquiring, at least one MCS table and a threshold of time density of at least one PT-RS corresponding to each of MCS table.

Step S202d2 may further comprise determining, a MCS table corresponding to the preset transmission(s) from the at least one acquired MCS table.

In certain embodiments, the time density of PT-RS corresponding to the preset transmission(s), according to the MCS index scheduled by the DCI or configured by the higher layer signaling and the determined threshold of time density of the at least one PT-RS corresponding to the MCS table is determined.

In an exemplary embodiment, step S202 may include at least one of following: Step S202g (not shown), Step S202h (not shown), and Step S202i (not shown).

According to various embodiments, at Step S202g a potential resource set not for data mapping according to the configuration information in the higher layer signaling, and determining resource set not for a data mapping according to the indication information in the DCI for indicating the data channel transmission is determined.

In some embodiments, at Step S202h a resource set not for a data mapping set according to the configuration information in the higher layer signaling is determined.

Step S202i may comprise determining the potential resource set not for data mapping by the configuration information in the higher layer signaling, and determining the data mapping avoidance resource according to the group common DCI.

In an exemplary embodiment, the UE receives at least one of downlink control information (DCI) or higher layer signaling from a base station, determines a transmission format of the data transmission based on at least one of the DCI or the higher layer signaling and performs the data transmission based on the determined transmission format. Furthermore, the transmission format may comprises at least one of a time domain resource, a frequency domain resource, a modulation scheme, a resource location for a reference signal, a transport block size, the number of repetitions or the number of transmissions.

In an exemplary embodiment, the UE may determines a time domain resource allocation (TDRA) set based on the higher layer signaling; determines an entry of the TDRA set according to the DCI; and determines the number of transmissions based on the number of parameter sets of the determined entry of the TDRA set.

In an exemplary embodiment, a parameter set of the entry of the TDRA set may comprise at least one of a Start symbol and Length Indicator Value (SLIV) and a mapping type.

In an exemplary embodiment, the number of transmissions may be determined based on the number of SLIVs of the determined entry of the TDRA set.

In an exemplary embodiment, the entry of TDRA set may comprise at least two parameter sets and each of the parameter sets corresponds to the time domain resource.

In an exemplary embodiment, the UE may determine a time domain resource allocation (TDRA) set according to the higher layer signaling; determines an entry of the TDRA set according to the DCI; and determines the number of repetitions according to the number of parameter sets of the determined entry of the TDRA set.

In an exemplary embodiment, the UE may determine a TDRA mapping method based on a format of the DCI received from the base station.

In an exemplary embodiment, the UE may determine at least one resource to be bypassed; and perform the data transmission based on the determined transmission format and the at least one resource to be bypassed.

In an exemplary embodiment, the at least one resource to be bypassed may comprise at least one of a resource not for data mapping as indicated by Radio Resource Control (RRC) or a resource that needs data mapping avoidance dynamically indicated by the DCI.

Certain embodiments according to the present application provide a method of data transmission. In certain embodiments, the method of data transmission in the present application comprises: receiving DCI and/or higher layer signaling transmitted by a base station; determining a transmission format of data transmission according to the received DCI and/or the higher layer signaling, wherein, the transmission format includes at least one of the following: a time domain resource, a frequency domain resource, a preset number of transmission, a modulation scheme, a resource location for reference signal and a transport block size, and wherein, the preset number of transmission includes: a number of transmission and/or a number of repetition; and performing the data transmission based on the transmission format of data transmission. That is, the UE may receive the transmission format of data transmission configured by the base station, including at least one of the following: a time domain resource, a frequency domain resource, a preset number of transmission, a modulation scheme, a resource location for reference signal and a transport block size, and perform the data transmission according to the transmission format received by the base station, thereby solving the problem that the transmission format such as the modulation scheme, the reference signal, the resource position in each preset transmission is difficult to be determined due to the different lengths of the symbols used in each actual preset transmission.

In addition, the preset transmission (transmission and/or retransmission) can be an actual transmission or a nominal transmission. The nominal transmission is a transmission configured by the base station to the UE. The actual transmission is segmented into at least two transmissions on the resource other than the resource not available for transmission, when there is resource not available for transmission within the allocated nominal transmission. In addition, when the nominal transmission crosses a slot boundary, it may be divided into two transport blocks by the slot boundary for transmission, for example, semi-static or dynamically configured symbol(s) opposite to the transmission direction, or flexible symbol(s), or the resource configured by the base station that cannot be used for uplink or downlink transmission. Wherein, the flexible symbol(s) are symbol(s) that can be rewritten into another direction. For example, the flexible symbol(s) can be rewritten as uplink or downlink symbol(s) or can be maintained as flexible symbol(s) by dynamic indication.

In an exemplary embodiment, a method of data transmission, which is performed by a base station, as shown in FIG. 2, comprises the following operations:

S301: which comprises determining a transmission format of data transmission.

S302, which comprises transmitting the transmission format of data transmission by the DCI and/or the higher layer signaling.

S303, which comprises performing the data transmission based on the transmission format of data transmission.

In an exemplary embodiment, the transmission format includes at least one of the following: a time domain resource, a frequency domain resource, a preset number of transmission, a modulation scheme, a resource location for reference signal, and a transport block size, wherein, the preset number of transmission includes: a number of transmission and/or a number of repetitions. In certain embodiments, the execution sequence of the steps S301, S302, and S303 are not limited to the execution sequence shown in FIG. 2B, and any possible execution sequence is within the protection scope of the present application.

In an exemplary embodiment, the base station determines a transmission format of data transmission; transmits information regarding the transmission format of the data transmission, based on at least one of downlink control information (DCI) or higher layer signaling; and performs the data transmission based on the determined transmission format.

In an exemplary embodiment, the transmission format may comprise at least one of a time domain resource, a frequency domain resource, a modulation scheme, a resource location for reference signal, a transport block size, the number of repetitions or the number of transmissions.

In an exemplary embodiment, the base station may determine a TDRA mapping method; and transmit a predetermined format of the DCI corresponding to the determined TDRA mapping method received from the base station. The present application further provides a method of data transmission. In certain embodiments, the method of data transmission in certain embodiments of the present application comprises: determining a transmission format of data transmission; transmitting the transmission format of data transmission by the DCI and/or the higher layer signaling; performing the data transmission based on the transmission format of data transmission. That is, in certain embodiments of the present application, when the base station determines the transmission format of data transmission, the determined transmission format of data transmission may be transmitted to UE by the DCI and/or the higher layer signaling, such that that UE acquires the transmission format required by the data transmission, and the data transmission is performed after acquiring the transmission format, to solve the problem that the transmission format such as the modulation scheme, the reference signal, the resource position in each preset transmission is difficult to be determined due to the different lengths of the symbols used in each actual preset transmission.

The following describes a method of data transmission by a specific embodiment, as following:

Certain embodiments describe how to indicate the SLIV of the start symbol S and the length L (joint coding) in the TDRA.

In the NR system of some embodiments, the base station configures the set for TDRAs by the RRC, and further dynamically indicates one of them through the DCI. In the Rel-15 NR system, each entry in the set of TDRAs configured by the higher layer signaling includes: slot offset K2 (which is used to determine the start slot of PUSCH transmission), mapping type (type A and type B of DMRS mapping)), the SLIV being indicated for providing the start symbol S and the length L (joint coding) or directly indicating the start symbol S and the length L, demodulation reference signal (DMRS) position (dmrs-TypeA-Position in the NR protocol).

The PUSCH is taken as an example in following. The same method is applied to the PDSCH.

PUSCH-TimeDomainResourceAllocation::=SEQUENCE {
 k2 INTEGER(0 . . . 32) OPTIONAL, --Need S
 mapping Type ENUMERATED {typeA, typeB},
 startSymbolAndLength INTEGER (0 . . . 127)
}

The slot in which the UE transmits the PUSCH is determined by K2 as $$\left\lfloor n \cdot \frac{2^{\mu_{PUSCH}}}{2^{\mu_{PDCCH}}} \right\rfloor + K_2.$$

In certain embodiments, n is the slot in which the DCI is scheduled, $K_2$ is determined based on the numerology of the PUSCH, and the µPUSCH and µPDCCH are the subcarrier spacing of the PUSCH and the PDCCH, respectively, and The start symbol S assigned to the PUSCH with respect to the start slot, and the number L of consecutive symbols calculated from the symbol S are determined in the following manner and according to the SLIV corresponding to the row of the index:

If (L−1)≤7 there is SLIV=14×(L−1)+S, otherwise, SLIV=14×(14−L+1)+(14−1−S)
Wherein, 0<L≤14−S, and Setting the mapping type of the PUSCH based on the PUSCH mapping type of Type A and Type B manners defined in section 6.4.1.1.3 of the protocol TS 38.211 according to the mapping type corresponding to the row of the index.

In order to reduce the latency and ensure the reliability, in the meantime in order to handling the different UL/DL symbol configurations and different uplink and downlink slot configurations in different slots. A TDRA set may be designed to include multiple parameter sets of TDRA, wherein, the TDRA parameters include: SLIV or directly indicating a start position S and an allocation length L, and/or a slot offset K2 value and/or a mapping type. For example, the configuration shown in Table 1 may be configured by the RRC, in which it is not necessary to respectively indicate the PUSCH mapping type for each parameter set of TDRA. In this way, the base station may have sufficient flexibility to select a suitable set of configurations according to factors such as UL/DL configuration, SRS configuration, etc., currently used in the system. Since all parameters may be configured by the RRC, this method may support multiple scenarios such as multiple transmissions in one slot and repetition across different slots. In Table 1, each parameter set include a slot offset K2 and a respectively configured start position S and an allocation length L, and the data mapping types are the same. In another example, the mapping type of the data may be different. In addition, in the resource allocation table can be configured in the system, or one or more parameter sets of resource allocation can be configured by the RRC, wherein, the directly indicated start position S and the allocation length L may also be indicated by the SLIV. Further, Table 1 may be extended to more sets of parameters, wherein, the number of sets of parameters may be configured by the RRC.

TABLE 1

| Serial number | PUSCH mapping type | A first parameter set $K_2$ | S | L | A second parameter set $K_2$ | S | L |
|---|---|---|---|---|---|---|---|
| 1 | Type A | J | 0 | 2 | j | 2 | 2 |
| 2 | Type A | J | 0 | 7 | j | 7 | 4 |
| 3 | Type A | J | 2 | 8 | j + 1 | 0 | 6 |
| 4 | Type B | J | 1 | 8 | j + 1 | 2 | 10 |
| 5 | Type B | J | 8 | 6 | j + 1 | 0 | 4 |
| 6 | Type B | J | 10 | 4 | j + 1 | 0 | 8 |
| 7 | Type B | J | 4 | 6 | j + 1 | 4 | 6 |
| 8 | Type A | j + 1 | 0 | 14 | j + 2 | 0 | 14 |
| 9 | Type A | j + 1 | 0 | 12 | j + 2 | 0 | 12 |
| 10 | Type A | j + 1 | 0 | 10 | j + 2 | 0 | 10 |
| 11 | Type A | j + 2 | 0 | 14 | NA | NA | NA |
| 12 | Type A | j + 2 | 0 | 12 | NA | NA | NA |
| 13 | Type A | j + 2 | 0 | 10 | NA | NA | NA |
| 14 | Type B | J | 8 | 6 | NA | NA | NA |
| 15 | Type A | j + 3 | 0 | 14 | NA | NA | NA |
| 16 | Type A | j + 3 | 0 | 10 | NA | NA | NA |

In the Rel-15 NR system, the number of repetition k is configured by the RRC, and in the LTE system, the number of repetition k is dynamically indicated by the DCI. For a method in which each index in one TDRA set may include at least one or more sets of TDRA parameters, the number of repetition k may be indicated by the following exemplary methods:

Method A: determining according to the number of parameter set of TDRA in the TDRA set.

Specifically, for example, in Table 1, there are two sets of parameters in the indexes 1 to 10, and only one parameter set in the indexes 11 to 16. For the indexes 1 to 10, it means that there is k (wherein, k=2) repetitions, and for the indexes 11 to 16, it means there is k (wherein, k=1) repetition.

Method B: The base station is indicated by other domain(s) or other information element(s) (IE) in the DCI or RRC.

In this case, the number of parameter set of TDRA in each entry of the TDRA set may be different from the number of repetition k configured by the base station. At this time, the number of repetition actually used for transmission may be determined by at least one of the following manners:

Manner 1: All data transmission indicated by the entire set of TDRA parameter(s) are repeated wholly.

Figure 3A:
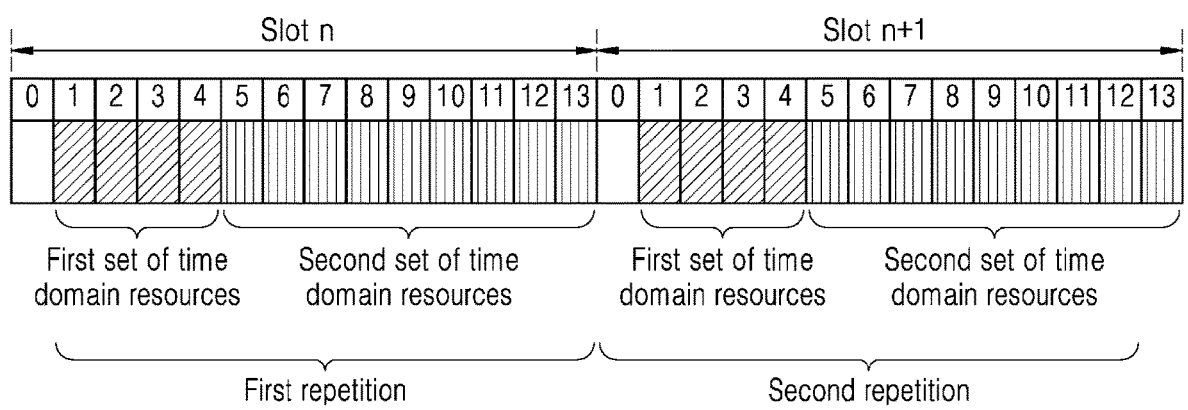
FIG. 3A illustrates aspects of determining a transmission format and performing data transmission according to certain embodiments of the present application.

For example, as shown in FIG. 3A, one entry of the TDRA set indicates two sets of time domain resources, which are transmitted in symbols 1~4 in slot n and in symbols 5~13 in slot n respectively. In addition, the UE obtains the number of repetition k=2 from the base station, and all transmissions indicated by the entire set of TDRA parameter(s) are repeated entirely. repetition may be performed continuously (i.e., starting from the next available symbol). Or, as shown in FIG. 3A, the repetition may be performed on the same resource in the next slot n+1, that is, the transmission indicated by the first set of time domain resources are retransmitted on the symbols 1~4 of the slot n+1 and the data indicated by the second set of time domain resources is transmitted on the symbols 5~13. At this time, the number of actually transmitted data is the number of sets m indicated by the entry multiplied by the number of repetition k.

Manner 2: A part of the PUSCH transmission is repeated according to a predefined rule or a rule configured by the base station.

For example, only the data transmission indicated by the last X sets of parameters is repeated, wherein, X is predefined in the standard or configured by signaling. Or, the base station selects to repeat the data transmission indicated by one or several sets of parameters according to the remaining number of symbols in each slot.

Figure 3B:
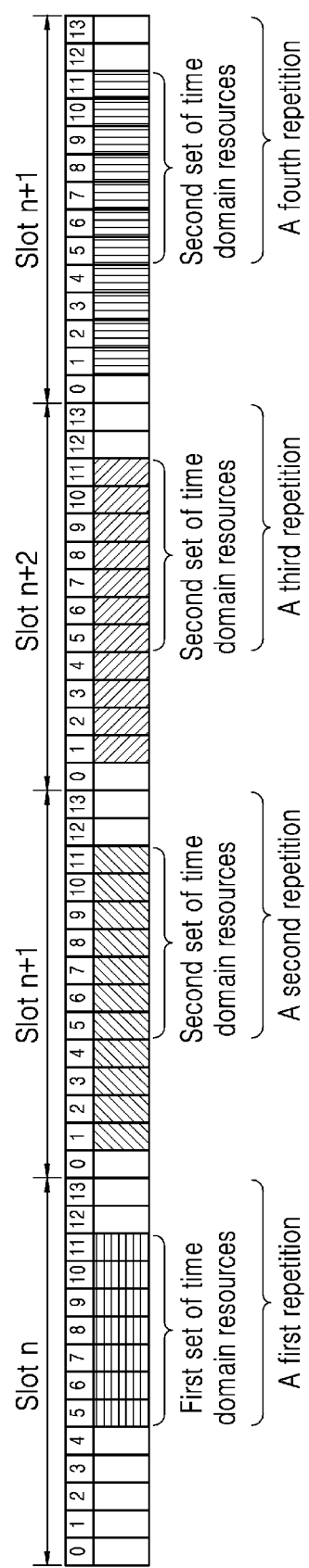
FIG. 3B illustrates aspects of determining a transmission format and performing data transmission according to certain embodiments of the present application.

Specifically, as shown in the illustrative example of FIG. 3B, one entry of the TDRA set indicates two sets of time domain resources, which are transmitted in symbols 5~11 in slot n and in symbols 1~11 in slot n+1, respectively. If the number of repetition is k=4, only the last k−1 sets of parameters are repeated according to the configuration of the base station or the predefined rule in the standard. The transmission indicated by the first parameter set is the first repetition, the transmission indicated by the second parameter set is the second repetition, and the subsequent two repetitions are determined according to the resource indicated by the second parameter set. That is, the third repetition occupies symbols 1~11 in slot n+2, and the third repetition occupies symbols 1~11 in slot n+3. Similarly, when the number of sets m of time domain resource parameters indicated for transmission in the TDRA is less than k, the transmission is performed in the first m times according to the indication in the TDRA, and the transmission is performed in the latter k-m times according to the indication of the mth parameter set. The latter k-m sets may be transmitted on the latter k-m slots with the start symbol position S indicated and the position of the symbol length L by the mth parameter set. Or, continue the transmission from the next available symbol according to the symbol length L in the mth parameter set.

Manner 3: When the number of repetition k is not greater than the number of parameter set of TDRA, the data transmission is performed according to the first k sets of parameters.

Or, it may be defined by a protocol: a scenario in which the number of repetition k is not equal to and/or greater than the number of sets of parameter is not supported. Then, in this case, in combination with the method of data transmission according to the first k sets of parameters when the number of repetition k is greater than the number of parameter set of TDRA, a set of TDRA set may be further configured to indicate more scenarios. At this time, k may be dynamically indicated by the DCI, which may better adapt to channel changes and service requirements. However, this method requires additional overhead to indicate the number of repetition k (e.g., RRC or DCI). If the same overhead is utilized, a similar effect may be obtained for Method A by increasing the number of entries in the TDRA set. For example, a 4-bit TDRA indication may be extended to 5 or 6 bits to indicate a state in 32 or 64.

However, constructing a more flexible TDRA set with more bits will additionally introduce more RRC overheads. For example, there are 16 entries originally, two sets of parameters in each entry need two 7 bits to indicate the SLIV, then a total of 16*7=112 bits are needed for completion. According to certain embodiments, the expansion to 32 entries requires twice the RRC overhead for completion. Certain embodiments of the present application further provides a method for configuring signaling of TDRA: configuring a combination of multiple sets of candidate parameters; indicating at least one entry in the combination as each entry in the TDRA set.

Specifically, in certain embodiments, methods for configuring signaling of TDRA comprise:

Pre-configuring candidate set {K2, SLIV} and indexing from 0~m−1

Using $\lceil \log 2(m) \rceil$ bits to indicate a combination of {k2, SLIV} in the candidate set This method may effectively reduce the RRC signaling overhead, where $\lceil \ \rceil$ is the upper ceiling operation.

Furthermore, this method may define S+L<=14 and L<=14 to control the number of bits of the SLIV.

The following illustrate how to determine the position of the DMRS according to certain embodiments of this disclosure:

In the NR, the reference point l for determining the time domain position of the reference signal and the position $l_0$ of the first DMRS symbol are determined as follows:

For the Type A of PUSCH mapping:

if the frequency hopping of frequency domain is disabled, l is defined as the start position of the slot; if the frequency hopping of frequency domain is enabled, l is defined as the start position relative to each frequency hopping;

$l_0$ is given according to the higher layer parameter: dmrs-TypeA-Position;

For the Type B of PUSCH mapping:

if the frequency hopping of frequency domain is disabled, l is defined as the start position of scheduled PUSCH resource, and if the frequency hopping of frequency domain is enabled, l is defined as the start position relative to each frequency hopping;

$l_0=0$;

For the Type B of PUSCH mapping, since the position of the first DMRS is determined by the start position of the actual transmission, when multiple sets of time domain resource parameters are configured, the relative start position in each repetition/transmission (several consecutive symbols) in each parameter set of time domain resource is defined by l.

Figure 3C:
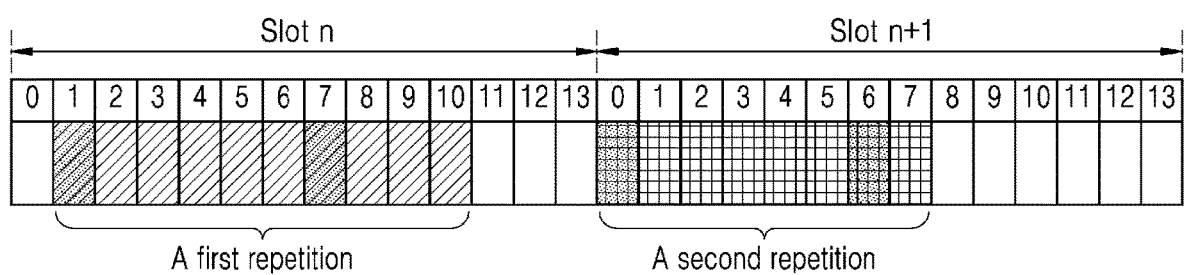
FIG. 3C illustrates aspects of determining a transmission format and performing data transmission according to certain embodiments of the present application.

As shown in the illustrative examples of FIG. 3C, the UE acquires the fourth column in TDRA table indicated by the DCI, and determines that the first PUSCH repetition is in slot n, the start position S is the symbol 1, and the length of L is 10 according to the value of K2 in the first parameter set; determine that the second PUSCH repetition is in slot n+1, the start position S is the symbol 0, and the length of L is 8 according to the value of K2 in the second parameter set. In addition, the PUSCH mapping type in TDRA is shared (i.e., identical) for the two parameters, and is the Type B of mapping. According to the above rule, the reference point l is the relative start position of each PUSCH repetition, and the DMRS transmission position is $l_0=0$. At this time, the first DMRS of the first PUSCH repetition is transmitted on the symbol 1 of the slot n, and the first DMRS of the second PUSCH repetition is transmitted on the symbol 0 of the slot n+1. In addition, the base station also configures an additional DMRS for the UE, which is indicated by the higher layer parameter: dmrs-AdditionalPosition. Then, at this time, the position of the additional DMRS is determined according to the number of symbols occupied by each PUSCH repetition. According to the Table 6.4.1.1.3-3 of 3GPP TS 38.211, when L=10, the extra reference signaling is transmitted on the 8th symbol, and when L=8, the extra DMRS is transmitted on the 6th symbol.

For the Type A of PUSCH mapping, only S=0, L>=4 and 4<=S+L<=14 are considered valid in the Rel-15 NR (when configured as a normal cyclic prefix (CP) length), as shown in Table 2. Similarly, the method of above multiple sets of SLIV values may be also applied to the limits shown in Table 2.

TABLE 2

| Type of PUSCH | Normal CP | | | Expansion CP | | |
|---|---|---|---|---|---|---|
| mapping | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ..., 12} | {1, ..., 12} | {1, ..., 12} |

In certain embodiments, for the Type A of PUSCH mapping, the position of the DMRS is determined by the start position and the end position of the symbols occupied by all PUSCHs in one slot, and if the DMRS exists, the configuration is considered a valid configuration in each transmission. That is, the UE does not expect that there is no DMRS for PUSCH transmission configured according to Type A in any transmission/repetition. The specific configuration mode may be determined by the base station.

Certain embodiments according to this disclosure provide the advantage that it is easier to align the reference signaling positions of different UEs. When there are multiple PUSCH transmissions in one slot, the base station may ensure that each PUSCH has DMRS by configuring additional reference signaling and selecting the transmission position of each PUSCH.

Figure 4:
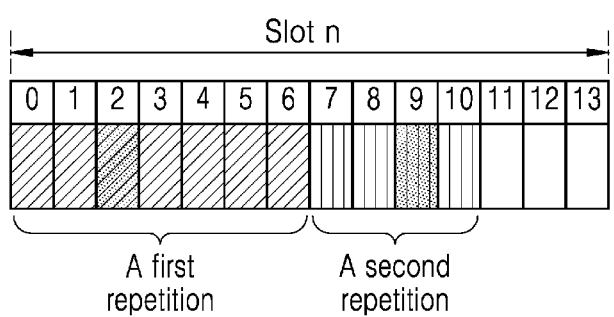
FIG. 4 illustrates aspects of determining a transmission format and performing data transmission according to certain embodiments of the present application.

As shown in non-limiting example of FIG. 4, the UE acquires the second column in the TDRA table indicated by the DCI, and determines that the first PUSCH repetition is in slot n, the start position S is symbol 0, and the length of L is 7 according to the value of K2 in the first parameter set; determines that the second PUSCH repetition is also slot n, the start position S is the symbol 7, and the length of L is 4 according to the value of K2 in the second parameter set. In addition, the type of PUSCH mapping in TDRA is shared (i.e., identical) for two parameter sets, and is the Type A of mapping. According to the above rule, the reference point 1 is the start position of each slot, the first DMRS transmission position given by the higher layer parameter dmrs-TypeA-Position is "pos2", and the higher layer parameter: dmrs-AdditionalPosition is indicated as "pos1". At this time, the first DMRS is transmitted on symbol 2 of slot n, and the second DMRS is transmitted on symbol 9 of Slot n. This configuration is considered valid since the DMRS exists in two PUSCH transmissions.

The following example describes how to switch between multiple repetitive transmission rules, as described in the following paragraphs:

The above method is different from the TDRA of PUSCH and/or mapping method or the TDRA of PDSCH and/or mapping method in the Rel-15 NR. In certain embodiments, the UE needs to determine how to perform switching between the existing method of the TDRA in the Rel-15 (only one parameter set is required) and the above method or other methods (e.g., a method of performing continuous other PUSCH repetition mapping according to the first PUSCH repetition).

In certain embodiments, the method for determining multiple TDRA and/or mapping may be at least one of the following methods:

Method 1: Determining the existing resource allocation method in the Rel-15 or the new method that supports multiple parameter sets of TDRA according to the indexed of the row indicated in the TDRA table.

For example, rows 1-10 in Table 1 have two parameter sets of TDRA, while rows 11-16 in Table 1 have a parameter set of TDRA. If the DCI dynamically indicates any of the rows 1-10, it means that the new TDRA and/or mapping method in previous is used; if the DCI dynamically indicates any of the rows 11-16, it means that the existing TDRA and/or mapping method in the Rel-15 is used. In particular, all TDRA sets configured the by RRC may be configured as one or multiple parameter sets of TDRA. At this time, it is not necessary to specifically distinguish between the method in Rel-15 and the method in Re-16.

Method 2: A method of indicating one or more TDRAs and/or mappings in a plurality of different TDRA and/or mapping methods by DCI.

Specifically, a method is determined by at least one of the following: adding a specific field in the DCI, setting a specific field to at least one specific value, or a different DCI format, different RNTIs for scrambling, different search spaces, different DCI payload sizes, different control resource sets (CORESET). Specifically, the resource allocation method indicated by the fallback DCI is the existing method in Rel-15, and the resource allocation method indicated by the other DCI is a new method. The base station configures the method of the TDRA and/or mapping corresponding to each different DCI to the UE by the RRC.

Both of the above two methods may be dynamically switched indicated by the DCI. If all DCI related parameters are configured to the same TDRA and/or mapping method, the DCI dynamic switching is not required. If the base station needs to switch to a different method, the reconfiguration is performed by the RRC (refer to Method 3).

The following embodiments mainly describe how the modulation scheme and/or the code rate are determined, as follows:

In order to achieve low latency and high reliability, and to avoid slot boundary as well as symbol and/or slot that cannot be used for uplink transmission, it may cause that the symbol length of each repetition/transmission of PUSCH or PDSCH carried in the same transport block is different. In certain embodiments, the repetition/transmission may include: repetition and/or transmission, which may be generated according to a predefined rule (e.g., segmenting into two or more number of repetition/transmission when encountering a symbol or slot boundary that cannot be used for uplink transmission), or generated due to multiple sets of TDRA parameter scheduling (such as the TDRA method described above). Since different repetition/transmission needs to transmit the same transport block size (TBS), the number of symbols in the repetition/transmission each time is different, which results in different actual spectral efficiency for each repetition/transmission. In the MCS table of Rel-15, different spectral efficiencies correspond to different modulation schemes. Specifically, it may be determined that each repetition/transmission modulation scheme is the same (it may be determined that each repetition/transmission modulation scheme is a fixed modulation scheme), or the modulation scheme of repetition/transmission each time is respectively determined according to actual transmission efficiency and/or code rate.

When the same modulation scheme is adopted by each repetition/transmission, the UE may determine the modulation scheme for the first repetition/transmission, and then the UE determines that the remaining repeating modulation schemes are the same as the modulation scheme for the first repetition.

In an exemplary embodiment, the UE may determine the modulation scheme for the first repetition/transmission, by at least one of the operations described in the following paragraphs:

The UE may acquire the MCS index, and modulates each repetition/transmission of PUSCH or PDSCH according to the modulation scheme corresponding to the MCS index in the MCS index table; or The UE may acquire the MCS index, and determines whether the corresponding code rate is higher than the threshold for the first repetition/transmission. If the threshold is exceeded, the modulation order is adjusted, and the modulation scheme for the first repetition/transmission is determined according to the adjusted modulation order.

In an exemplary embodiment, adjusting the modulation order may comprise increasing the modulation order or decreasing the modulation order.

Further, the UE may acquire the MCS index, and determine whether the corresponding code rate is higher than the threshold upon using for the first repetition, including: the UE determines whether the redundancy version (RV) is a specific RV; or the UE determines whether the first repetition or each repetition needs to support self-decodable.

In various embodiments, the base station may adopt any of the above-described methods when configuring the modulation scheme.

Specifically, Table 3 illustrates an example of an MCS index table. The UE may obtain the MCS index 15 by using the MCS/TBS domain in the DCI or the uplink configured grant configured by the RRC, it may be determined that the modulation scheme is QPSK, and the target code rate is R×1024-679. The UE determines the TBS according to a predefined rule and a time domain frequency domain resource configuration. However, since the number of actually repeated symbols each time may be different, some symbols may be less, resulting in the actual spectral efficiency is higher than the efficiency of 1.3262 corresponding to index 15 in the MCS table, and even more than the efficiency of 1.4766 corresponding to number 16 in the MCS table (modulation scheme corresponding to index 16 in the MCS table is 16QAM), but the QPSK modulation scheme is still used. Vice versa, the UE obtains the MCS index 16 indicated by the DCI or RRC, and determines that the MCS is 16QAM. The UE determines the TBS according to a predefined rule and a time domain frequency domain resource configuration. However, since the actual spectral efficiency in actual repetition is lower than the efficiency of 1.4766 corresponding to the index 16 in the MCS table, even lower than the efficiency of 1.3262 corresponding to the index 15 in the MCS table, the 16QAM modulation is still adopted. The disadvantage of this method is that if the symbol length in one repetition is too short (assuming that the rate matching method should deal with the case where the transmission symbol length is different in each repetition), which causes the actual code rate being too high, and even unable to being self-decodable. This situation can affect the demodulation performance and can affect the latency (which needs to be decoded together with other repetitions/transmissions). However, the method for determining the modulation scheme is simple and easy to implement, and may avoid additional requirements for transmitting end and/or radio frond-end (RF) for different modulation schemes, such as power back off required by different modulation schemes, thereby resulting in different actual transmission power actually used in each repetition/transmission or other situations.

In an exemplary embodiment, the modulation scheme of each repetition/transmission may be respectively determined according to the actual transmission efficiency and/or the code rate, and may be performed by the base station or the UE. As shown in in the example of FIG. 10, the method comprises the following operations:

Step S1001, determining a TBS of a PUSCH or a PDSCH;

Step S1002: determining a code rate and/or a spectrum efficiency adopted by at least one repetition/transmission of multiple repetitions/transmissions according to at least one of following:

Determined TBS, the number L of symbols actually transmitted in the at least one repetition/transmission;

Step S1003: determining a modulation scheme of each repetition/transmission according to at least one of the following:

The code rate adopted by the at least one repetition/transmission, the spectral efficiency adopted by the at least one repetition/transmission, a predefined TBS table, a code rate threshold, and a spectral efficiency threshold.

In certain embodiments, the code rate threshold may be predefined in the protocol or configured by the base station (for example, by RRC or DCI), and the spectrum efficiency threshold may also be predefined in the protocol or configured by the base station. It is not limited in certain embodiments of the present application.

In certain embodiments, the predefined TBS table is composed of several rows, and any of the rows may comprise one or multiple of the following: the modulation order, the target code rate multiplied by 1024, and the spectral efficiency.

In some embodiments, a row to which the corresponding code rate and/or the corresponding spectral efficiency correspond is searched for in the predefined TBS table according to the code rate and/or the spectral efficiency, and the modulation scheme is determined according to the modulation order indicated by the row. In an exemplary embodiment, searching the corresponding coding rate and/or spectral efficiency includes at least one of the following: the nearest code rate and/or spectral efficiency, greater than or equal to the nearest code rate and/or spectral efficiency, less than or equal to the nearest code rate and/or spectral efficiency.

Figure 10:
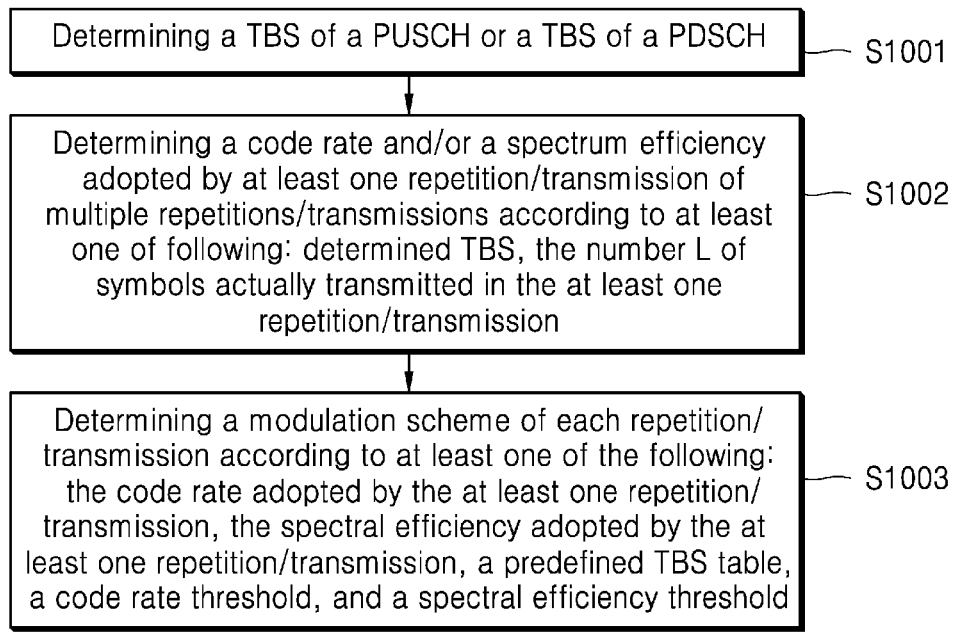
FIG. 10 illustrates aspects determining a modulation scheme of each repetition/transmission according to an actual transmission efficiency and/or a code rate according to certain embodiments of the present application.

In an exemplary embodiment, the above steps S1001, S1002 and S1003 are not limited to the execution order shown in the example of FIG. 10, and other execution orders are within the contemplated scope of the present application.

As shown in the non-limiting example of FIG. 4, the UE may determine that the TBS of the PUSCH or PDSCH is M, and the number of symbols for the first repetition is L1=7, the number of symbols for the second repetition is L2=4. The UE may calculate the number of resource element (RE) that can perform PUSCH or PDSCH data mapping according to parameters such as the number L1 of symbol, the reference signaling overhead, and the resource configuration of the frequency domain, and calculate the actual transmission efficiency E1=1.18 of the first repetition according to the number of the REs and the TBS (M) of the PUSCH or the PDSCH, and infers the MCS sequence IMCS=14 corresponding to the actual transmission efficiency E1 according to the actual transmission efficiency E1 and the MCS sequence table 3, wherein, the modulation scheme by indicated by IMCS=14 is QPSK which is used as the modulation scheme used for the first repetition. Similarly, the UE may calculate the number of REs that can perform PUSCH or PDSCH data mapping according to the number L2 of symbols, the reference signaling overhead, and the resource configuration of the frequency domain, and calculates the actual transmission efficiency E2=2.36 of the first repetition according to the number of the REs and the TBS (M) of the PUSCH or the PDSCH, and determines that the 16QAM by indicated the MCS sequence IMCS=19 is the modulation scheme adopted by the second repetition.

In an exemplary embodiment, the base station may configure or predefine a threshold of one or more code rates and a modulation scheme corresponding to the threshold, and the UE may calculate the potential code rate and/or the actual transmission efficiency, and determine the modulation scheme according to the potential code rate and/or the actual transmission efficiency as well as the threshold of the corresponding code rate and/or the transmission efficiency. In an exemplary embodiment, the potential code rate may be calculated according to at least one of the following parameters: number L of symbols for one repetition, a reference signaling overhead, a TBS, and a modulation scheme indicated by the MCS sequence IMCS. Specifically, the base station may define a threshold of a code rate of 0.93. As shown in the illustrative example of FIG. 4, if the number of symbols for the first repetition is L1=7, the DMRS overhead is 1 symbol, the TBS is M, and the modulation scheme indicated by the MCS sequence IMCS 14 is QPSK, and the calculated potential code rate is 0.588; the number of symbols for the second repetition is L2=4, the TBS is M, and the modulation scheme indicated by the MCS sequence IMCS 14 is QPSK, and the calculated potential code rate is 1.176 (larger than the threshold of 0.93), the modulation scheme is promoted to 16QAM. In addition, if the potential code rate corresponding to the promoted modulation order is still greater than the threshold, the modulation order may be further increased until the maximum available modulation order.

The above method is also applicable to the modulation scheme that the base station determines the demodulation.

The above two methods may be configured by the RRC semi-static or DCI dynamic adjustment, or can be configured by the predefined rule. For example, if the UE determines that the potential code rate used for the first repetition/transmission is higher than the threshold, and the RV version number is all 0 or belongs to {0, 3}, the modulation scheme is adjusted dynamically to ensure that each transmission is guaranteed to be decoded independently.

TABLE 3

MCS sequence table

| MCS index $I_{MCS}$ | Modulation order $Q_m$ | Target code rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |

TABLE 3-continued

MCS sequence table

| MCS index $I_{MCS}$ | Modulation order $Q_m$ | Target code rate R × 1024 | Spectral efficiency |
|---|---|---|---|
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | | reserved |
| 29 | 2 | | reserved |
| 30 | 4 | | reserved |
| 31 | 6 | | reserved |

The following embodiments mainly describe the time density, the time domain position, and the position of the time-frequency resource of the reference signal for phase tracking (PT-RS), as follows:

In certain embodiments, the Rel-15 NR system designs the PT-RS. When OFDM is used as the carrier modulation scheme, the time density of PT-RS is determined according to the MCS. Taking the uplink of Cyclic Prefix-Orthogonal Frequency Division Multiplexing (CP-OFDM) as an example, the information elements of timeDensity and frequencyDensity in the PTRS-UplinkConfig higher layer signaling indicates the threshold values of ptrs-MCSi, i=1, 2, 3 and NRB,i, i=0, 1, respectively. If both the above higher layer signalings are configured, the UE may assume that the PT-RS antenna port's presence and pattern may be related to the corresponding scheduled MCS and scheduled bandwidth. Table 4 is a functional relationship between the time density of the PT-RS and the scheduled MCS.

TABLE 4

| Scheduled MCS | Time density ($L_{PT-RS}$) |
|---|---|
| $I_{MCS}$ < ptrs-MCS$_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

For the uplink of the Discrete Fourier Transform-Spread Spectrum-Orthogonal Frequency Division Multiplexing (DFT-S-OFDM), the base station will directly configure a sample density and a time density for UE. In certain embodiments, the time density $L_{PT-RS}$=1 or 2.

Figure 5A:
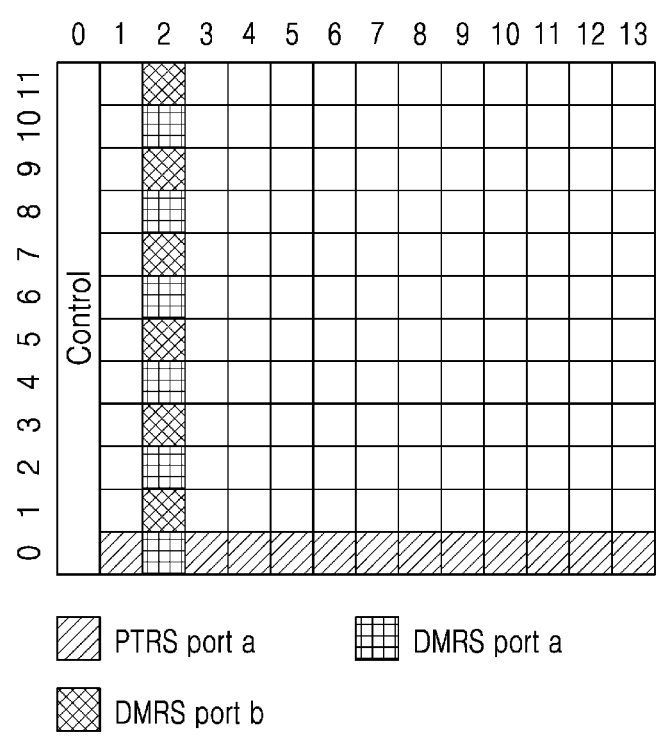
FIGS. 5A, provides examples of schematic diagrams of time density of a PT-RS according to certain embodiments of the present application.
Figure 5B:
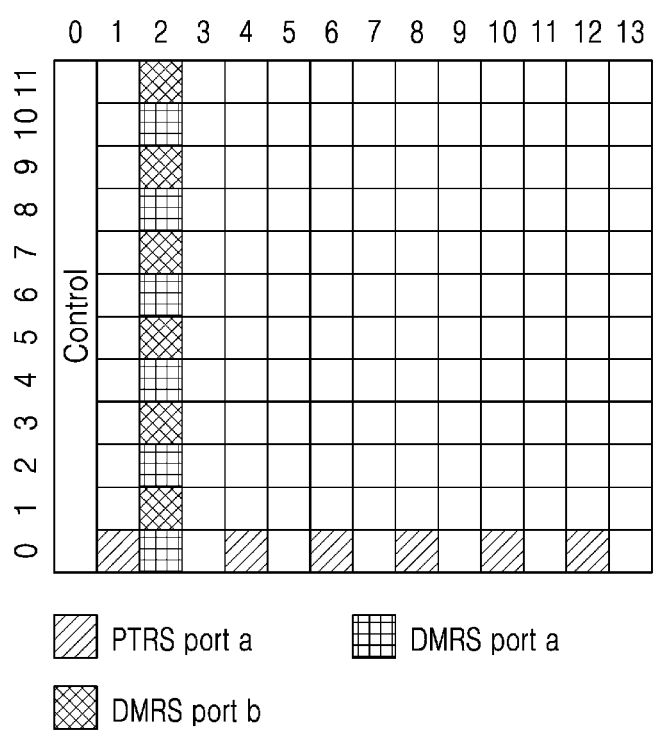
FIG. 5B provides examples of schematic diagrams of time density of a PT-RS according to certain embodiments of the present application.
Figure 5C:
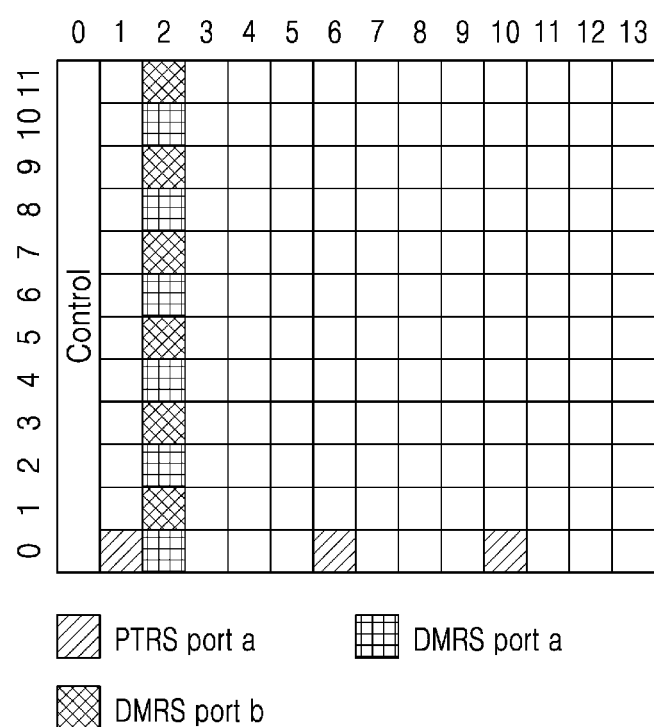
FIG. 5C provides examples of schematic diagrams of time density of a PT-RS according to certain embodiments of the present application.

FIGS. 5A, 5B and 5C illustrate aspects of the time density of PT-RS according to various embodiments. As shown in the illustrative examples of FIGS. 5A, 5B and 5C, for a physical resource block (PRB) that performs PT-RS transmission, the PT-RS occupies subcarrier 0 to performs transmission, OFDM symbol 0 is occupied by the PDCCH, and DMRS antenna port a and antenna port b occupies OFDM symbol 2. In FIGS. 5A, 5B and 5C, the PT-RS is transmitted at time density ($L_{PT-RS}$) of 1, 2 or 4, respectively. Taking the downlink as an example, the mapping of the PT-RS in the time domain needs to avoid the downlink control channel region and the DMRS, and the symbol is not taken into account. For example, as shown in FIG. 5C, if the time density of the PT-RS is 4, the symbol 1 is occupied, the transmission is performed on the 4th symbol (symbol 6) after symbol 2, and then the transmission is performed on the subsequent symbol 10. As described above, when the lengths of the symbols are different in each repetition/transmission, the same or different MCSs are used, while the code rate and the spectral efficiency in each transmission may also be different. Therefore, how to determine the time density of PT-RS becomes a key issue. Specifically, the time density of PT-RS may be determined by one or more of the following methods:

Method 1: Determining the time density of the PT-RS by the index IMCS in the corresponding MCS table according to the average spectral efficiency and/or the average code rate corresponding to all repetitions/transmissions.

Specifically, the UE may calculate an average spectral efficiency E' and/or an average code rate R' corresponding to all repetitions/transmissions; the UE may search the MCS index IMCS corresponding to the closest code rate and/or spectral efficiency in a predefined MCS table according to the calculated E' and/or R', and compares the MCS index IMCS with the threshold value to determine the time density LPT-RS of the PT-RS.

Method 2: Determining the time density LPT-RS of the PT-RS according to the MCI index scheduled by the DCI or configured by the RRC.

Specifically, the UE may obtain the MCS index IMCS according to the DCI or RRC, and compare the MCS index IMCS with the threshold value configured by the base station as a function of MCS to determine the time density LPT-RS of the PT-RS. The method is equal to determining the time density LPT-RS of the PT-RS according to the MCS of nominal transmission (retransmission and/or transmission).

Method 3: Searching the index IMCS,i corresponding to the code rate and/or spectral efficiency closest to Ri and/or Ei in the MCS table according to the actual code rate Ri and/or the actual spectral efficiency Ei of any repetition/transmission, and determining the time density LPT-RS of the PT-RS based on IMCS, i. At this time, the actual reference signaling density of the PT-RS in each repetition/transmission may be different.

Specifically, the UE may calculate an average spectral efficiency E' and/or an average code rate R' of any repetition/transmission; the UE may search the MCS index IMCS corresponding to the closest code rate and/or closest spectral efficiency closest in the predefined MCS table according to the calculated E' and/or R', and compares the MCS index IMCS with the threshold value configured by the base station to determine the time density LPT-RS of the PT-RS.

In certain embodiments, if a PT-RS is required for each retransmission/transmission, the time density LPT-RS of the PT-RS is determined for each retransmission/transmission, respectively.

Method 4: Determining the time density of the PT-RS according to the actual spectral efficiency and/or actual code rate of the first repetition/transmission as well as the index IMCS in the corresponding MCS table.

In some embodiments, the UE may calculate a spectral efficiency E1 and/or a code rate R1 of the first repetition/transmission; the UE may search the MCS index IMCS corresponding to the closest code rate and/or closest spectral efficiency in the predefined MCS table according to the calculated E1 and/or R1, and compares the MCS index IMCS with the threshold value configured by the base station to determine the time density LPT-RS of the PT-RS.

In particular, when a transmission is an actual transmission, Method 4 and Method 2 may determine different PT-RS densities. Specifically, for example, when the first transmission is segmented into multiple actual transmissions, the actual spectrum efficiency and/or the actual code rate of the actual first transmission may be higher than the spectrum efficiency and/or the code rate corresponding to the MCS configured by the base station to the UE in Method 2.

Method 5: Determining the time density $L_{PT\text{-}RS}$ of the PT-RS according to the reference signaling density parameter configured by the base station through the RRC or DCI, or determining the time density of the PT-RS as a predetermined value.

For example, the base station may directly configure that the density of PT-RS is 2, or be fixed to 2 in the protocol, or if the base station does not configure the reference signaling density, no PT-RS transmission is performed.

In certain embodiments, the base station may configure a plurality of MCS tables for UE. For example, in order to save DCI overhead, a table that requires fewer number of MCS bit is reconfigured. Then, the base station can separately configure thresholds for determining the time density of the PT-RS for different MCS tables. For example, the first MCS requires a 5-bit indication (as shown in Table 3) and the second MCS table requires a 4-bit indication (as shown in Table 5).

For the first MCS table (such as Table 3), the base station can configure three thresholds, for example, ptrs-MCS1i is 6, 16, 24, respectively.

For the second MCS table (such as Table 5), the base station can configure three thresholds, for example, ptrs-MCS2i is 2, 4, and 6, respectively.

When the UE receives the resource allocation corresponding to the first MCS table (when the resource allocation corresponding to the first MCS table is received through DCI or RRC or MAC), determining the time density of the PT-RS according to the threshold value ptrs-MCS1i corresponding to the first MCS table; when the UE receives the resource allocation corresponding to the second MCS table (when the resource allocation corresponding to the second MCS table is received through DCI or RRC or MAC), determining the time density of the PT-RS according to the threshold value ptrs-MCS2i corresponding to the second MCS table.

In addition, for different MCS tables or different thresholds, tables corresponding to different MCS and time densities of PT-RS may be defined or configured in the protocol in advance. For example, for the second MCS table, only tables corresponding to MCS and time density of PT-RS composed of one or two threshold values may be configured or defined. At this point, the base station only needs to configure one or two thresholds for it.

The second MCS table may be a subset of the first MCS table. For example, as shown in Table 5, each MCS index IMCS1 in Table 5 is included in the MCS index IMCS corresponding to the first MCS table. Then, according to the ptrs-MCS1i for the first MCS table and index in the first MCS table corresponding to the MCS index (such as IMCS1 in Table 5) indicated in the second MCS table (such as IMCS1 in Table 5 and MCS index IMCS corresponding to Table 3), the density of PR-RS is determined. In certain embodiments, according to the code rate and/or the spectral efficiency corresponding to one MCS index in Table 5, the corresponding spectral index can be determined in another table.

Specifically, the MCS index of the corresponding second MCS table (Table 5) is IMCS1=1, the MCS index of the corresponding first MCS table (Table 3) is IMCS=4, configured by the base station. The threshold configured by the base station for the first MCS table is 6, 16 and 24, respectively. Then, at this time, IMCS-4<ptrs-MCS11=6, according to Table 4, it can be determined not to perform PT-RS transmission.

In some embodiments, for the case of configuring the second MCS table, a default method may be set (if the threshold corresponding to the second MCS table is not configured) to use the threshold in the first MCS table, use the threshold of the second MCS table upon configuring the threshold of the second MCS table.

TABLE 5

MCS index table

| MCS index $I_{MCS1}$ (MCS index $I_{MCS}$ corresponding to Table 3) | Modulation order $Q_m$ | Code Rate R × 1024 | Spectral Efficiency |
|---|---|---|---|
| 0(0) | Q | 60/q | 0.0586 |
| 1(4) | Q | 156/q | 0.1523 |
| 2(8) | 2 | 193 | 0.3770 |
| 3(12) | 2 | 449 | 0.8770 |
| 4(16) | 4 | 378 | 1.4766 |
| 5(20) | 4 | 616 | 2.4063 |
| 6(24) | 6 | 567 | 3.3223 |
| 7(28) | Q | reserved | |

In another example, the correspondence of multiple MCS tables are not directly given, but need to be inferred implicitly based on the code rate or the spectral efficiency. Then, the code rate and/or the spectral efficiency in the first MCS table can be matched with the code rate and/or the spectral efficiency corresponding to at least one row in the second MCS table, so as to find the MCS index in the corresponding first MCS table. The method for performing matching includes at least one of the following: equal to the code rate and/or the spectral efficiency; closest to the code rate and/or the spectral efficiency; the closest to and not greater than the code rate and/or spectral efficiency; the closest to and not greater than or equal to the code rate and/or spectral efficiency; the closest to and not less than the code rate and/or spectral efficiency; the closest to and not less than or equal to the code rate and/or spectral efficiency.

The second MCS table can be defined directly in the specification, or configured according to the base station (for example, directly configuring one or more columns in the first MCS table), or calculated according to rules. If the base station directly configures one column in the second MCS tables with a column in the first MCS table, the base station can directly obtain the index of column in the first MCS table according to the configuration relationship. The method for calculating according to the rule may include: calculating a correspondence between the first MCS table and the second MCS table according to a first parameter and/or a second parameter. In certain embodiments, the parameters are configured according to the base station or obtained according to the number of bits used to indicate each table. Specifically, the base station configures 4 as for the first parameter, that is, one of every 4 rows in the first MCS table is used as a row in the second MCS table. Further, if the second parameter configured by the base station or obtained according to a predefined rule is 0, it indicates that the row that satisfies IMCS mod 4=0 in the first MCS table is selected to form a second MCS table.

In another example, the first MCS table is indicated by a1=5 bits, and the second MCS table is indicated by a2=3 bits, then it can be inferred (from the first parameter being 2^(a1−a2)) that one of every 4 rows in the first MCS table is used as a row in the second MCS table, that is, the first parameter is 4.

According to various embodiments, the above methods can be combined. For example, if the base station does not configure the MCS table through higher layer signaling, a second MCS table is constructed according to predefined rules.

When the number of bits used in the second MCS table is small, it is difficult to retain all MCS indices 28-31 for retransmission (where each index indicates a modulation mode). Then, in order to be able to adjust the modulation mode for retransmission, it can be represented by other MCS values. When the UE receives the DCI for retransmission, the modulation mode is determined only according to the MCS index, and the transport block size (or code rate/transmission efficiency) for retransmission is not calculated according to the MCS. However, at this time, the time density of PT-RS used for the retransmission can be dynamically adjusted according to the MCS.

In one implementation, different DCI formats, and/or search spaces, and/or CORESETs, and/or scrambling sequences (RNTI, etc.) may correspond to different MCS tables and/or pilot density thresholds. The UE may determine a corresponding MCS table and/or pilot density threshold based on the detected DCI format, and/or search space, and/or CORESET, and/or scrambling sequence. In particular, the base station may configure different pilot density thresholds for different DCI formats, and/or search spaces, and/or CORESETs, and/or scrambling sequences (RNTI, etc.) even if the number of bits of MCS table is the same. This can be adapted to different transmission requirements (such as higher reliability, etc.).

If a system supports multiple transmission formats of uplink and downlink data channels, the base station may configure corresponding MCS table and/or pilot density threshold for different transmission formats, respectively.

Further, in some embodiments, the UE may determine the time domain position of the PT-RS in all repetitions/transmissions from the start symbol of the first repetition/transmission according to the determined time density LPT-RS of the PT-RS. Or, the UE may determine the time domain position of the PT-RS in each repetition/transmission from the start symbol of each repetition/transmission according to the determined time density $L_{PT-RS}$ of the PT-RS. Alternatively, the UE may determine the slot start position in all the PUSCH retransmission/transmission. In certain embodiments, each retransmission/transmission can be an actual transmission or a nominal transmission.

Further, taking PUSCH as an example, the method for determining the position of the PT-RS time-frequency resource of the PUSCH comprise: when all the following conditions are met, the PT-RS of the PUSCH is mapped to the RE according to the following formula:

$$\begin{bmatrix} a_{k,l}^{(p_0,\mu)} \\ \vdots \\ a_{k,l}^{(p_{\rho-1},\mu)} \end{bmatrix} = \beta_{PT-RS} W \begin{bmatrix} r^{(\tilde{p}_0)}(2n+k') \\ \vdots \\ r^{(\tilde{p}_{\upsilon-1})}(2n+k') \end{bmatrix},$$

-continued $$\text{wherein, } k = \begin{cases} 4n + 2k' + \Delta & \text{configuration type 1} \\ 6n + k' + \Delta & \text{configuration type 2} \end{cases};$$

The time index l is transmitted in the OFDM symbol allocated for the PUSCH. When the PUSCH has multiple repetition/transmissions, l should be in any OFDM symbol allocated for the PUSCH;

REs (k, l) are not occupied by demodulation reference signal (DM-RS);

k' and $\Delta$ correspond to $\tilde{p}_0, \ldots, \tilde{p}_{v-1}$;

In certain embodiments, the number k' and $\Delta$ are given in Tables 6.4.1.1.1 and 6.4.1.1.3-2 of 3GPP TS38.211, the configuration type is configured by the higher layer parameter DMRS-UplinkConfig, and the precoding matrix w is given in Section 6.3.1.5 of 3GPP TS38.211. The number $\beta_{PTRS}$ is a scaling factor of one amplitude, indicating the transmission power.

The set of time index l is defined as the start position of the TDRA of PUSCH with respect to any of the multiple transmissions/transmissions or the start position of the first repetition/transmission, or the start position of the continuous symbol set in all PUSCH repetition/transmission and/or the start position of the slot:

1. Setting i=0 and $l_{ref}$=0;
2. If any overlaps with the DMRS in the interval max $(l_{ref}+(i-1)L_{PT-RS}+1, l_{ref}), \ldots, l_{ref}+iL_{PT-RS}$, then Settings i=1;
   If it is the DM-RS of a single symbol, then $l_{ref}$ is set as the symbol index of the DM-RS, or the second DM-RS symbol in the dual symbol DM-RS;
   If $l_{ref}+iL_{PT-RS}$ is in the TDRA of PUSCH of any of the multiple repetitions/transmissions, or in the TDRA of PUSCH of any repetition/transmission, or in any time domain resource of all repetitions/transmissions actually transmitted by the PUSCH, step 2 is repeated;
3. Adding $l_{ref}+iL_{PT-RS}$ to the time domain index set of the PT-RS;
4. Adding i to 1;
5. If $l_{ref}+iL_{PT-RS}$ is in the TDRA of PUSCH of any of the multiple repetitions/transmissions, or in the TDRA of PUSCH of any repetition/transmission, or in any time domain resource of all repetitions/transmissions actually transmitted by the PUSCH, step 2 is repeated;

In certain embodiments, $L_{PT-RS} \in \{1,2,4\}$ is as shown in Table 4.

Specifically, as shown in the illustrative example of FIG. 3C, the set of time index l is defined as: symbol 1 and symbol 0, wherein, symbol 1's start position in time domain of the PUSCH of the first repetition/transmission in two transmissions is in slot n, and symbol 0's start position in time domain of the PUSCH of the second repetition/transmission in two transmissions is in slot n+1. Or, the set of time index l is defined as: symbol 1 whose start position in time domain of the first repetition/transmission. Or, the set of time index l is defined as: symbol 1 and symbol 0, wherein the symbol 1's start position of the first set of consecutive symbols sets in both the two repetition/transmission of PUSCH is in slot n, and the symbol 0's start position of the second set of consecutive symbols sets is in slot n. At this time, the start position of the second set of consecutive symbols is just the start position of the slot (i.e., the first symbol).

Certain embodiments of the above step 5 (also applies to the last sub-step in step 2) comprise: determining whether $l_{ref}+iL_{PT-RS}$ is in symbols 1 to 10 of slot n of the TDRA of PUSCH of the first repetition/transmission in two transmissions or symbols 0 to 7 of slot n+1 of the TDRA of PUSCH of the second repetition/transmission in two transmissions. At this time, the start position of the first repetition in the multiple repetitions or the start position of all the PUSCH transmissions is applied as the relative position calculating the set of time index l.

According to certain embodiments step 5 (also applies to the last sub-step in step 2) comprises: when the start position with respect to each PUSCH transmission is used as the relative position, calculating the set of time index l, whether $l_{ref}+iL_{PT-RS}$ is in symbols 1 to 10 of slot n of the TDRA of PUSCH of the repetition/transmission for the first repetition is determined. For the second repetition, the above process is repeated.

The same method is also applicable to PT-RS in PDSCH.

The following embodiments are, in certain embodiments, used to determine that the UE and other UEs are used for uplink transmission, such as a sounding reference signal (SRS) resource position and/or an uplink control information (UCI) resource position, and finally determines the mapping manner of the channel used by the UE for transmission, as follows:

In the LTE system, the SRS can only be configured in the last symbol of each subframe. In the NR system, the base station may configure multiple SRS resource sets for the UE, and each SRS resource set includes one or more SRS resources, and each SRS resource includes 1, 2 or 4 SRS ports. Each SRS resource may be configured in 1, 2 or 4 consecutive symbols in the last 6 OFDM symbols of a slot. In addition, the UCI of the NR may be transmitted at any symbol position in a slot. In the NR of the Rel-15 version, only repetition in a unit of slot is supported, then the base station may avoid collision with potential SRS (SRS of the UE or other UEs) or UCI of other UEs by TDRA in each slot. However, in order to reduce latency and ensure reliability, the way to support continuous repetition is being discussed in the NR of the Rel-16 version. For example, repetition in a unit of a mini-slot is supported. Or, when a symbol or slot (e.g., a symbol or slot for downlink transmission, and/or a flexible symbol or slot, etc.) or a slot boundary that is not available for uplink transmission is encountered, the repetition is required to segment into two repetitions. These rules may be predefined in the protocol. Then, when the UE or other UEs needs to perform uplink transmission, the base station needs to notify the UE to bypass the resources of the potential uplink transmission during transmission by at least one of the following methods (Method 1, Method 2, and Method 3) described below:

Method 1: Configuring potential resource set not for data mapping by RRC, and dynamically indicating resource that needs data mapping avoidance by a DCI indicating data channel transmission.

In certain embodiments, the base station configures the resource set of the potential SRS or UCI to the UE by using the RRC, includes: a period and an offset in unit of slot (for example, SRS-periodicityAndOffset), a start position (startPosition) in the slot, and number of symbols (nrofSymbols). Specifically, the RRC parameter may be configured as:

```
periodicityAndOffset
startPosition           INTEGER (0..5),
nrofSymbols             ENUMERATED {n1, n2, n4},
```

In certain embodiments, nrofSymbols indicates the position of the OFDM symbol (N=1, 2 or 4 symbols), startPosition indicates its start position, SRSSymbolStartPosition=0 . . . 5; "0" indicates the last symbol of the slot, "1" indicates a penult symbol.

```
SRS-Periodicity AndOffset ::=    CHOICE {
    sl1                             NULL,
    sl2                             INTEGER(0..1),
    sl4                             INTEGER(0..3),
    sl5                             INTEGER(0..4),
    sl8                             INTEGER(0..7),
    sl10                            INTEGER(0..9),
    sl16                            INTEGER(0..15),
    sl20                            INTEGER(0..19),
    sl32                            INTEGER(0..31),
    sl40                            INTEGER(0..39),
    sl64                            INTEGER(0..63),
    sl80                            INTEGER(0..79),
    sl160                           INTEGER(0..159),
    sl320                           INTEGER(0..319),
    sl640                           INTEGER(0..639),
    sl1280                          INTEGER(0..1279),
    sl2560                          INTEGER(0..2559)
}
```

In certain embodiments, sl1 indicates that the period is 1 slot, sl2 indicates that the period is 2 slots, and so on. Each period corresponds to one offset in unit of slot. For sl1, its offset is zero.

In another illustrative example, the set of resources for the potential SRS or UCI configured by the base station to the UE through RRC may include: a period and an offset in units of slot (e.g., SRS-periodicity AndOffset), and a symbol location indicated by a bitmap in the slot.

If the number of repetitions for one data channel is large or the length is long that may span slot periods of several mapping avoidance resource, in this case it is necessary to infer which of the slots may have SRS and/or UCI transmission by the slot period and the offset parameter of the mapping avoidance resource. Or, which slot or slots in the slots spanned by the data channel have the SRS and/or UCI transmission may be indicated by the DCI.

Figure 11:
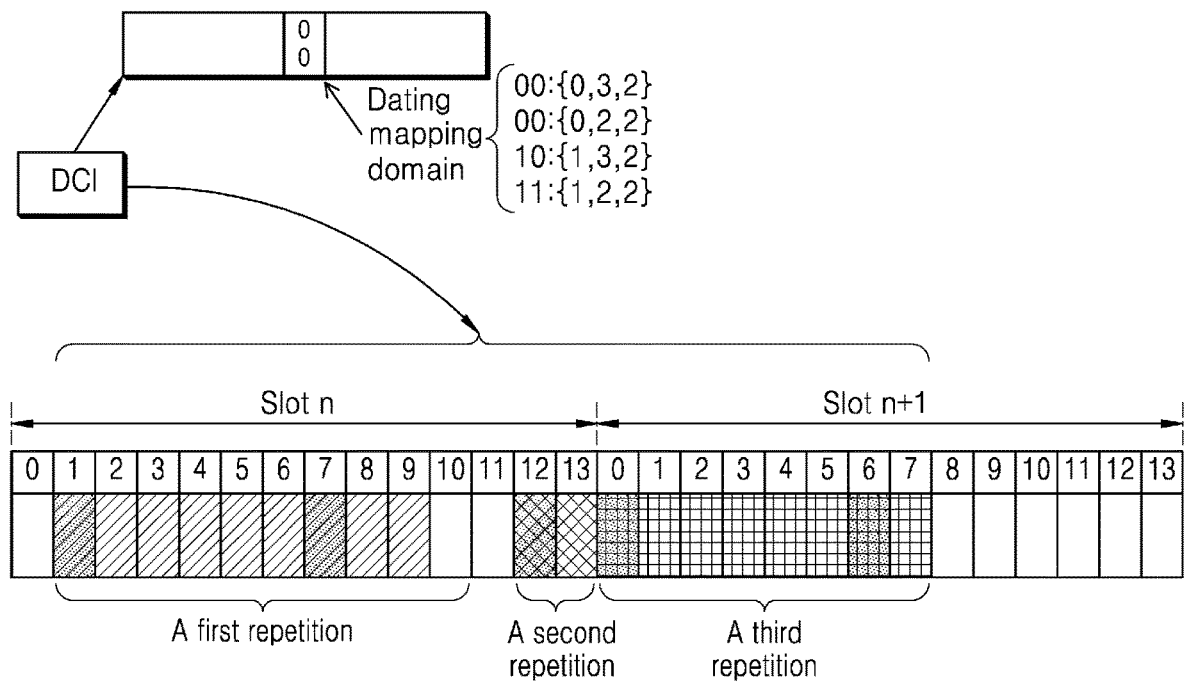
FIG. 11 illustrates aspects of indicating a data transmission resource mapping manner according to certain embodiments of the present application.

Specifically, as shown in the illustrative example of FIG. 11, the base station may configure a set of several potential SRSs and/or UCI transmissions {slot number, symbol start position, symbol length} by RRC, and one of the set is dynamically indicated by the DCI data mapping domain: {slot number 0, symbol start position 3, symbol length 2}. Since the data transmission indicated by the DCI starts from symbol 1 of slot n and continues to symbol 7 of slot n+1, and the data mapping domain in the DCI indicates that first two symbols starting from the last four symbol in the first slot (i.e., the slot n) of the data transmission cannot perform data mapping, and the actual data transmission indicated by the DCI is mapped from symbol 1 of slot n to symbol 9 of slot n, and is not mapped on the symbols 10 and 11 of slot n, and is continuously mapped from symbol 11 of slot n until symbol 7 of slot n+1.

According to various embodiments, if the number of repetitions of one data channel is small, there is no need to provide a slot period and offset parameter for mapping avoidance resource.

Method 2: Directly configuring the data mapping avoidance resource set by RRC. According to certain embodiments, this method may be done by reusing the uplink and downlink symbols and/or the slot direction, or by introducing a new way to indicate data mapping avoidance. The specific configuration example of the RRC is as above. The base station configures the mapping avoidance resource set to the UE by using the RRC, includes: a period and a offset (for example, SRS-periodicity AndOffset) of the data mapping avoidance resource in unit of slot, and a start position (startPosition) in the slot, the number of symbols (nrofSymbols).

In another illustrative example, the set of resources for the potential SRS or UCI configured by the base station to the UE through RRC may include: a period and an offset in units of slot, and a symbol location indicated by a bitmap in the slot.

According to various embodiments, method 2 does not require the dynamic participation of DCI, and saves DCI overhead. In addition, Method 2 may be more suitable for configured grant or semi-persistent schedule (SPS) data transmission.

Method 3: Configuring a potential resource set not for data mapping by RRC, and dynamically indicating the data mapping avoidance resource by group common DCI. In certain embodiments, multiple users may receive group common DCI at the same time. This method may be used for dynamically scheduled data transmission or configured grant or SPS data transmission. In particular, the slot for uplink or downlink transmission may be rewritten to a slot that cannot be used for uplink or downlink transmission by using a group common DCI for indicating a slot format indicator (SFI).

Figure 5D:
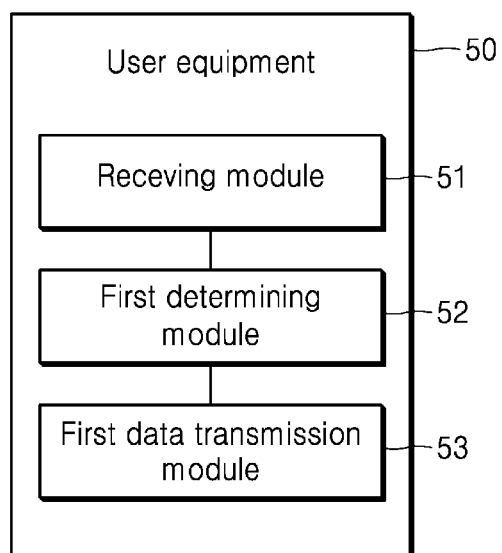
FIG. 5D schematically illustrates the structure of a user equipment according to certain embodiments of the present disclosure.

The slot involved in the foregoing embodiments may also be a time unit other than the slot, and the symbols involved in the foregoing embodiments may also be other time units other than the symbol, and the slot and symbols introduced in certain embodiments of the present application are not intended to limit the Embodiments according to the foregoing description introduce introduces a method of data transmission from a perspective of a method flow. The following describes a user equipment and a base station from a perspective of virtual module, wherein, the user equipment and the base station may perform the foregoing method of data transmission, as follows:

In an embodiment, a user equipment (UE), as shown in FIG. 5d, may include a receiving module 51, a first determining module 52 and a first data transmission module 53, However, all of the illustrated components are not essential. The UE may be implemented by more or less components than those illustrated in FIG. 5d.

In an exemplary embodiment, a receiving module 51 is configured to receive DCI and/or higher layer signaling transmitted by a base station.

In an exemplary embodiment, a first determining module 52 is configured to determine a transmission format of the data transmission according to the DCI and/or the higher layer signaling received by the receiving module 51.

In an exemplary embodiment, the transmission format includes at least one of the following: a time domain resource, a frequency domain resource, a preset number of transmission, a modulation scheme, a resource location for reference signal and a transport block size, and wherein, the preset number of transmission includes: a number of transmission and/or a number of repetition.

In an exemplary embodiment, a first data transmission module 53 is configured to perform the data transmission based on the transmission format of data transmission determined by the first determining module 52.

In an exemplary embodiment, the first determining module 52 is specifically configured to determine a TDRA set according to the higher layer signaling.

In an exemplary embodiment, at least one entry of the TDRA set includes multiple parameter sets of TDRA that are used to indicate the time domain resource.

In an exemplary embodiment, the first determining module 52 is further configured to determine one entry of the TDRA set according to the DCI, and determine the preset number of transmission according to the number of parameter set of the TDRA in the entry.

In an exemplary embodiment, the first determining module 52 is configured to determine a TDRA set according to the higher layer signaling, and determine one entry of the TDRA set according to the DCI and TDRA set, wherein, at least one entry of the TDRA set comprises multiple parameter sets of TDRA; and/or the first determining module 52 is specifically configured to determine the preset number of transmission according to the indication information indicating the preset number of transmission in the DCI and/or the higher layer signaling.

In an exemplary embodiment, the first data transmission module 53 is specifically configured to retransmit all the data corresponding to all parameter set(s) of TDRA for k time(s); and/or the first data transmission module 53 is specifically configured to: when the determined preset number of transmission k is greater than the number of parameter set of the TDRA included in one entry of the determined TDRA set, retransmit data corresponding to the partial sets of TDRA parameters according to a predefined rule or rule pre-configured by the base station; and/or the first data transmission module 53 is specifically configured to: when the determined preset number of transmission k is not greater than the number of parameter set of the TDRA included in one entry of the determined TDRA set, transmit data corresponding to the first k sets of TDRA parameters in the TDRA set.

In an exemplary embodiment, the first determining module 52 comprises: a first acquiring unit, a second acquiring unit and a first determining unit, wherein, the first acquiring unit is configured to acquire a candidate set pre-configured by the base station.

In an exemplary embodiment, the candidate set includes multiple preset combinations, and the preset combination includes at least one of the following: a slot offset, a combination of a start and length indicator SLIV, a start position S and a time domain length L, wherein, each preset combination is provided with a corresponding index; the second acquiring unit is configured to acquire the indication information transmitted by the base station.

In an exemplary embodiment, the indication information is used to indicate one of the indexes corresponding to the preset combination; the first determining unit is configured to determine the transmission format of data transmission based on the candidate set pre-configured by the base station and acquired by the first acquiring unit as well as the indication information transmitted by the base station and acquired by the second acquiring unit.

In an exemplary embodiment, the second acquiring unit is specifically configured to acquire a TDRA set transmitted by the base station.

In an exemplary embodiment, each entry of the TDRA set includes one or more pieces of indication information.

In an exemplary embodiment, the first determining module 52 is specifically configured to: when it is determined that one entry of the TDRA set includes multiple sets of time domain resource parameters, determine a time domain position of a first demodulation signal (DMRS) for the data transmission according to a relative start position of each preset transmission in each parameter set of time domain resource.

In an exemplary embodiment, the first determining module 52 is configured to determine a fixed modulation scheme according to the received DCI and/or the higher layer signaling, wherein, the fixed modulation scheme is a modulation scheme adopted by each preset transmission; and/or, the first determining module 52 is further configured to determine the modulation scheme adopted by at least one preset transmission according to an actual transmission efficiency and/or a code rate, wherein, the actual transmission efficiency and/or the code rate are acquired by the received DCI and/or the higher layer signaling.

In an exemplary embodiment, the first determining module 52 comprises a third acquiring unit and a second determining unit, wherein, the third acquiring unit is configured to acquire a modulation and code scheme (MCS) index indicated in the DCI and/or the higher layer signaling.

In an exemplary embodiment, the second determining unit is configured to determine the modulation scheme adopted by the first preset transmission(s) according to the MCS index acquired by the third acquiring unit.

In an exemplary embodiment, the second determining unit is specifically configured to determine the modulation scheme adopted by the first preset transmission(s) as the modulation scheme corresponding to the MCS index in a MCS index table; and/or the second determining unit is further configured to adjust a modulation order if the code rate corresponding to the MCS index is greater than the preset threshold when used for the first preset transmission(s), and determine the modulation scheme adopted by the first preset transmission(s) based on the adjusted modulation order.

In an exemplary embodiment, the first determining module 52 is specifically configured to determine the transport block size (TBS), wherein, the TB is a TB corresponding to the PUSCH or a TB corresponding to the PDSCH.

In an exemplary embodiment, the first determining module 52 is further configured to determine a code rate and/or a spectral efficiency adopted by the at least one preset transmission according to at least one of the following: TBS, and the number of symbols actually transmitted by the at least one preset transmission; the first determining module 52 is further configured to determine the modulation scheme adopted by the at least one preset transmission according to at least one of the following: the code rate adopted by the at least one preset transmission, the spectral efficiency adopted by the at least one preset transmission, predefined TBS table, code rate threshold; and spectrum efficiency threshold.

In an exemplary embodiment, the first determining module 52 is further configured to determine, in the predefined TBS table, a row which the first code rate and/or the first spectral efficiency are corresponding to, according to the code rate and/or the spectral efficiency adopted by the at least one preset transmission.

In an exemplary embodiment, the first determining module 52 is further configured to determine a modulation scheme adopted by the at least one preset transmission according to a modulation order indicated by the row to which the first code rate and/or the first spectral efficiency correspond to.

In an exemplary embodiment, the first code rate and/or the first spectral efficiency is: a code rate and/or a spectral efficiency closest to the code rate and/or the spectral efficiency adopted by the at least one preset transmission in a predefined TBS table.

In an exemplary embodiment, the first determining module 52 is specifically configured to determine a time density of the PT-RS corresponding to the preset transmission(s) according to the received DCI and/or the higher layer signaling; and/or, the first determining module 52 is configured to determine the time domain locations of the PT-RS corresponding to all the preset transmission(s) or the time domain location of the PT-RS corresponding to any of preset transmission(s) according to the time density of the PT-RS corresponding to the preset transmission(s); and/or, the first determining module 52 is configured to determine the location(s) time-frequency resource of the PT-RS of the PUSCH according to the time density of the PT-RS corresponding to the preset transmission(s) and a time set.

In an exemplary embodiment, the first determining module 52 is specifically configured to determine the time density of the PT-RS corresponding to the preset transmission(s) according to the MCS index in the MCS table corresponding to the average spectral efficiency corresponding to all the preset transmission(s) and/or the average code rate corresponding to all the preset transmission(s); and/or, the first determining module 52 is specifically configured to determine the time density of the PT-RS corresponding to the preset transmission(s) by the MCS index scheduled by the DCI or configured by the higher layer signaling; and/or, the first determining module 52 is specifically configured to determine the time density of the PT-RS corresponding to the preset transmission(s) according to the MCS index in the MCS table corresponding to the actual code rate of any of preset transmission(s) and/or the MCS index in the MCS table corresponding to the actual spectrum efficiency of any of preset transmission(s); and/or, the first determining module 52 is specifically configured to determine the time density of the PT-RS corresponding to the preset transmission(s) according to the MCS index in the MCS table corresponding to the actual spectrum efficiency of the first preset transmission(s) and/or the MCS index in the MCS table corresponding to the actual code rate of the first preset transmission(s); and/or, the first determining module 52 is specifically configured to determine a time density of the PT-RS corresponding to the preset transmission(s) according to a reference signaling density parameter, wherein, the reference signaling density parameter is configured by the base station using the higher layer signaling or DCI; and/or, the first determining module 52 is specifically configured to determine the time density of the PT-RS corresponding to the preset transmission(s) as a preset value.

In an exemplary embodiment, upon determining the time density of PT-RS corresponding to the preset transmission(s) by the MCS index scheduled by the DCI or configured by the higher layer signaling, the first determining module 52 is specifically configured to: acquire, at least one MCS table and a threshold of time density of at least one PT-RS corresponding to each of MCS tables; determine, MCS table corresponding to the preset transmission(s) from the at least one acquired MCS table; determine, the time density of PT-RS corresponding to the preset transmission(s), according to the MCS index scheduled by the DCI or configured by the higher layer signaling and the determined threshold of time density of the at least one PT-RS corresponding to MCS table.

In an exemplary embodiment, the time set comprises: the start position of the TDRA of PUSCH of any of multiple preset transmission(s) or the start position of the first preset transmission(s), or the start position of the continuous symbol set and/or the slot of the start position of in all PUSCH preset transmission(s); and/or, the PUSCH time domain resource of any of multiple preset transmission(s) or the PUSCH time domain resource of any of preset transmission(s), or the time domain resource of all preset transmission(s) actually transmitted by PUSCH.

In an exemplary embodiment, the first determining module 52 is specifically configured to determine a potential resource set not for data mapping according to the configuration information in the higher layer signaling, and determine resource set not for a data mapping according to the indication information in the DCI for indicating the data channel transmission; and/or, the first determining module 52 is specifically configured to determine resource set not for a data mapping set according to the configuration information in the higher layer signaling; and/or, the first determining module 52 is configured to determine the potential resource set not for data mapping by the configuration information in the higher layer signaling, and determine the data mapping avoidance resource according to the group common DCI.

In an exemplary embodiment, provides a user equipment. In certain embodiments, the UE is configured for: receiving DCI and/or higher layer signaling transmitted by a base station; determining a transmission format of the data transmission according to the received DCI and/or the higher layer signaling, wherein, the transmission format includes at least one of the following: a time domain resource, a frequency domain resource, a preset number of transmission, a modulation scheme, a resource location for reference signal and a transport block size, and wherein, the preset number of transmission includes: a number of transmission and/or a number of repetition; and performing the data transmission based on the transmission format of data transmission. That is, the UE may receive the transmission format of data transmission configured by the base station, including at least one of the following: a time domain resource, a frequency domain resource, a preset number of transmission, a modulation scheme, a resource location for reference signal and a transport block size, and perform the data transmission according to the transmission format received by the base station, thereby solving the problem that the transmission format such as the modulation scheme, the reference signal, the resource position in each preset transmission is difficult to be determined due to the different lengths of the symbols used in each actual preset transmission.

The UE provided by various embodiments according to the present application is suitable to embodiment of methods such as described above, and details will not be described herein here.

Figure 6:
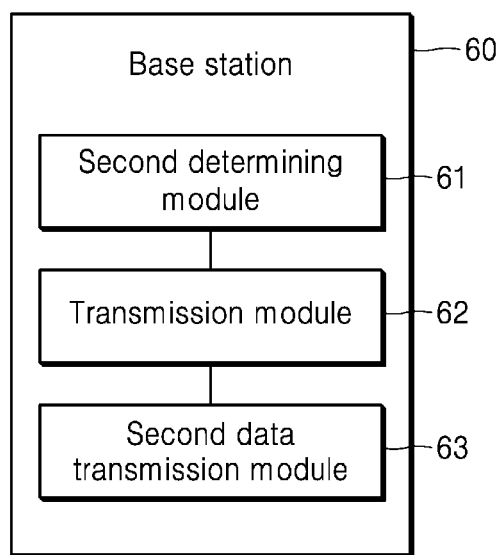
FIG. 6 schematically illustrates the structure of a base station according to certain embodiments of the present disclosure.

In an embodiment, a base station, for example, as shown in FIG. 6 may include a second determining module 61, a transmission module 62 and a second data transmission module 63. However, all of the illustrated components are not necessarily essential. The base station may be implemented in configurations having more or less components than those illustrated in FIG. 6.

In an exemplary embodiment, the second determining module 61 is configured to determine a transmission format of data transmission.

In an exemplary embodiment, the transmission module 62 is configured to transmit the transmission format of data transmission by the DCI and/or the higher layer signaling.

In an exemplary embodiment, the second data transmission module 63 is configured to perform the data transmission based on the transmission format of data transmission.

In an exemplary embodiment, the transmission format includes at least one of the following: a time domain resource, a frequency domain resource, a preset number of transmission, a modulation scheme, a resource location for reference signal and a transport block size, and wherein, the preset number of transmission includes: a number of transmission and/or a number of repetition.

Certain embodiments of the present application provide a base station. Certain embodiments of the present application comprise a base station configured for: determining a transmission format of data transmission; transmitting the transmission format of data transmission by the DCI and/or the higher layer signaling; performing the data transmission based on the transmission format of data transmission. That is, in certain embodiments according to the present application, when the base station determines the transmission format of data transmission, the determined transmission format of data transmission may be transmitted to UE by the DCI and/or the higher layer signaling, such that that UE acquires the transmission format required by the data transmission, and the data transmission is performed after acquiring the transmission format, to solve the problem that the transmission format such as the modulation scheme, the reference signal, the resource position in each preset transmission is difficult to be determined due to the different lengths of the symbols used in each actual preset transmission.

The base station provided by certain embodiments of the present application is suitable for, without limitation, practicing embodiments of the methods described above, and further details will not be described herein.

Figure 7:
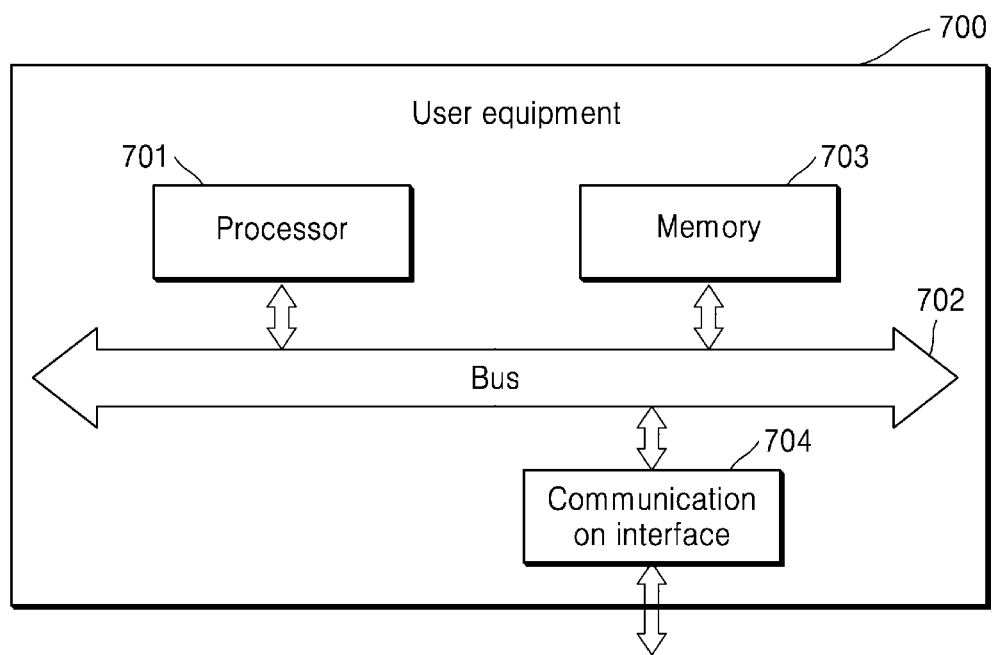
FIG. 7 schematically illustrates the structure of a user equipment according to certain embodiments of the present disclosure.
Figure 8:
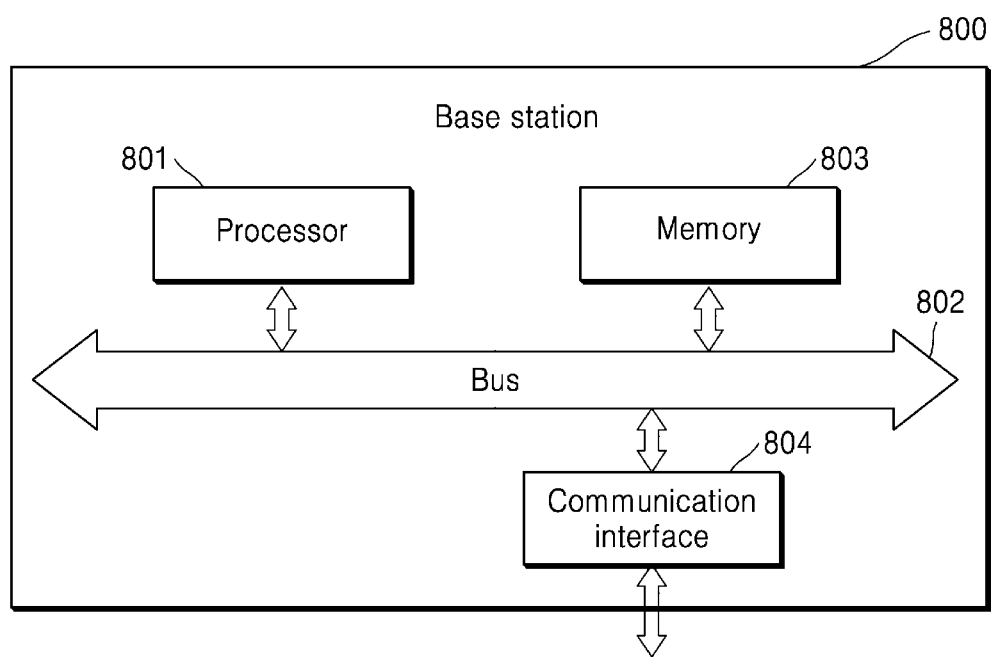
FIG. 8 schematically illustrates the structure of a base station according to certain embodiments of the present disclosure.

The foregoing describes certain embodiments of the method of data transmission, certain embodiments of the virtual device of UE, and certain embodiments of a virtual device of the base station. According to certain embodiments, a physical device of the UE and a physical device of the base station, are as follows:

As shown in the illustrative example of FIG. 7, the UE 700 shown in FIG. 7 includes: a processor 701, a memory 703 and communication interface 704. However, each of the illustrated components is not necessarily essential. The UE 700 may be implemented in embodiments having more or less components than those illustrated in FIG. 7. In addition, the processor 701, the memory 703 and the communication interface 704 may be implemented as a single chip according to another embodiment. Furthermore, the UEs described above may correspond to the UE 700. For example, the UE illustrated in FIG. 5d may correspond to the UE 700. The aforementioned components will now be described in detail.

According to certain embodiments, processor 701 is connected to the memory 703, such as through a bus 702. The processor 701 may include one or more processors or other processing devices that control the proposed function, process, and/or method. Operation of the UE may be implemented by the processor 701.

In an embodiment, the communication interface 704 may include an antenna. It should be noted that the communication interface 704 is not limited to one in the actual application, and the structure of the UE 700 does not limit certain embodiments of the present application. The communication interface 704 may correspond to a transceiver.

The communication interface 704 may include a RF transmitter for up-converting and amplifying a transmitted signal, and a RF receiver for down-converting a frequency of a received signal. However, according to another embodiment, the communication interface 704 may be implemented by more or less components than those illustrated in components.

The communication interface 704 may be connected to the processor 701 and transmit and/or receive a signal. The signal may include control information and data. In addition, the communication interface 704 may receive the signal through a wireless channel and output the signal to the processor 701. The communication interface 704 may transmit a signal output from the processor 701 through the wireless channel.

The processor 701 may be a CPU, a general purpose processor, a DSP, an ASIC, an FPGA or other programmable logic device, transistor logic device, hardware component, or any combination thereof. The processor 701 may implement or carry out the various illustrative logical blocks, modules and circuits described in connection with the present disclosure. The processor 701 may also be a combination of computing functions, such as a combination of one or more microprocessors, a combination of a DSP and a microprocessor, and the like.

The bus 702 can include a path for communicating information between the components described above. The bus 702 may be a PCI bus or an EISA bus or the like. The bus 702 may be divided into an address bus, a data bus, a control bus, and the like. For ease of illustration, the bus is represented by only one solid line in FIG. 7, but it does not mean that there is only one bus or one type of bus.

According to various embodiments, memory 703 may be an ROM or other type of static storage device that can store static information and instructions, RAM or other types of dynamic storage devices that can store information and instructions, or may be EEPROM, CD-ROM or other optical disk storage, optical disc storage (including compact disc, laser disc, optical disc, digital versatile disc, Blu-ray disc, etc.), magnetic disk storage media or other magnetic storage devices, or any other media that can be used to carry or store desired program codes in the form of instruction or data structure and can be accessed by the computer, but not limited to this.

The memory 703 may store the control information or the data included in a signal obtained by the UE 700. The memory 703 may be connected to the processor 701 and store at least one instruction or a protocol or a parameter for the proposed function, process, and/or method. The memory 703 is used to store application codes for executing the solution of the present application, and is controlled by the processor 701 for execution. The processor 701 is configured to execute application codes stored in the memory 703 to implement the content shown in any of the foregoing method embodiments.

The present application provides a user equipment. In certain embodiments, a UE according to the present application comprises a UE with a controller configured for: receiving DCI and/or higher layer signaling transmitted by a base station; determining a transmission format of the data transmission according to the received DCI and/or the higher layer signaling, wherein, the transmission format includes at least one of the following: a time domain resource, a frequency domain resource, a preset number of transmission, a modulation scheme, a resource location for reference signal and a transport block size, and wherein, the preset number of transmission includes: a number of transmission and/or a number of repetition; and performing the data transmission based on the transmission format of data transmission. That is, the UE may receive the transmission format of data transmission configured by the base station, including at least one of the following: a time domain resource, a frequency domain resource, a preset number of transmission, a modulation scheme, a resource location for reference signal and a transport block size, and perform the data transmission according to the transmission format received by the base station, thereby solving the problem that the transmission format such as the modulation scheme, the reference signal, the resource position in each preset transmission is difficult to be determined due to the different lengths of the symbols used in each actual preset transmission.

In an exemplary embodiment, the processor 701 may receive at least one of downlink control information (DCI) or higher layer signaling from a base station, determine the transmission format of the data transmission based on at least one of the DCI or the higher layer signaling, and perform the data transmission based on the determined transmission format, wherein the transmission format comprises at least one of a time domain resource, a frequency domain resource, a modulation scheme, a resource location for reference signal, a transport block size, the number of repetitions or the number of transmissions.

Certain embodiments according to the present disclosure comprise a base station. As shown in the non-limiting example of FIG. 8, the base station 800 shown in FIG. 8 includes: a processor 801, a memory 803 and communication interface 804. However, each of the illustrated components is not necessarily essential. Certain embodiments of base station 800 may be implemented with more or fewer components than those illustrated in FIG. 8. In addition, the processor 801, the memory 803 and the communication interface 804 may, in certain embodiments, be implemented as a single chip. Furthermore, the base stations described above may correspond to the base station 800. For example, the base station illustrated in FIG. 6 may correspond to the base station 800. The aforementioned components will now be described in detail.

According to various embodiments, processor 801 is connected to the memory 803, such as through a bus 802. The processor 801 may include one or more processors or other processing devices that control the proposed function, process, and/or method. Operation of the UE may be implemented by the processor 801.

In an embodiment, the communication interface 804 may include an antenna. It should be noted that the communication interface 804 is not limited to one in the actual application, and the structure of the base station 800 does not limit certain embodiments of the present application. The communication interface 804 may correspond to a transceiver.

In certain embodiments, communication interface 804 may include a RF transmitter for up-converting and amplifying a transmitted signal, and a RF receiver for down-converting a frequency of a received signal. However, according to another embodiment, the communication interface 804 may be implemented by more or less components than those illustrated in components.

The communication interface 804 may be connected to the processor 801 and transmit and/or receive a signal. The signal may include control information and data. In addition, the communication interface 804 may receive the signal through a wireless channel and output the signal to the processor 801. The communication interface 804 may transmit a signal output from the processor 801 through the wireless channel.

The processor 801 may be a CPU, a general purpose processor, a DSP, an ASIC, an FPGA or other programmable logic device, transistor logic device, hardware component, or any combination thereof. The processor 801 may implement or carry out the various illustrative logical blocks, modules and circuits described in connection with the present disclosure. The processor 801 can also be a combination of computing functions, such as a combination of one or more microprocessors, a combination of a DSP and a microprocessor, and the like.

The bus 802 may include a path for communicating information between the components described above. The bus 802 may be a PCI bus or an EISA bus or the like. The bus 802 may be divided into an address bus, a data bus, a control bus, and the like. For ease of illustration, the bus is represented by only one solid line in FIG. 8, but the figure should not be construed as requiring that there be only one bus or one type of bus.

The memory 803 may store the control information or the data included in a signal obtained by the base station 800. The memory 803 may be connected to the processor 801 and store at least one instruction or a protocol or a parameter for the proposed function, process, and/or method. The memory 803 may be an ROM or other type of static storage device that may store static information and instructions, an RAM or other types of dynamic storage devices that may store information and instructions, or may be EEPROM, CD-ROM or other optical disk storage, optical disc storage (including compact disc, laser disc, optical disc, digital versatile disc, Blu-ray disc, etc.), magnetic disk storage media or other magnetic storage devices, or any other media that may be used to carry or store desired program codes in the form of instruction or data structure and can be accessed by the computer, but not limited to this.

The memory 803 is used to store application codes for executing the solution of the present application, and is controlled by the processor 801 for execution. The processor 801 is configured to execute application codes stored in the memory 803 to implement the content shown in any of the foregoing method embodiments.

Embodiments according to the present application include a base station. In certain embodiments, the base station is configured for: determining a transmission format of data transmission; transmitting the transmission format of data transmission by the DCI and/or the higher layer signaling; performing the data transmission based on the transmission format of data transmission. That is, in certain embodiments of the present application, when the base station determines the transmission format of data transmission, the base station transmits the determined transmission format of data transmission to UE by the DCI and/or the higher layer signaling, such that the UE acquires the transmission format required by the data transmission, and performs the data transmission after acquiring the transmission format, to solve the problem that the transmission format such as the modulation scheme, the reference signal, the resource position in each preset transmission is difficult to be determined due to the different lengths of the symbols used in each actual preset transmission.

In an exemplary embodiment, the processor 801 may receive at least one of downlink control information (DCI) or higher layer signaling from a base station, determine the transmission format of the data transmission based on at least one of the DCI or the higher layer signaling, and perform the data transmission based on the determined transmission format, wherein the transmission format comprises at least one of a time domain resource, a frequency domain resource, a modulation scheme, a resource location for reference signal, a transport block size, the number of repetitions or the number of transmissions.

The base station provided by embodiment of the present application is suitable to the above embodiment of method, and details will not be described herein here.

Figure 9:
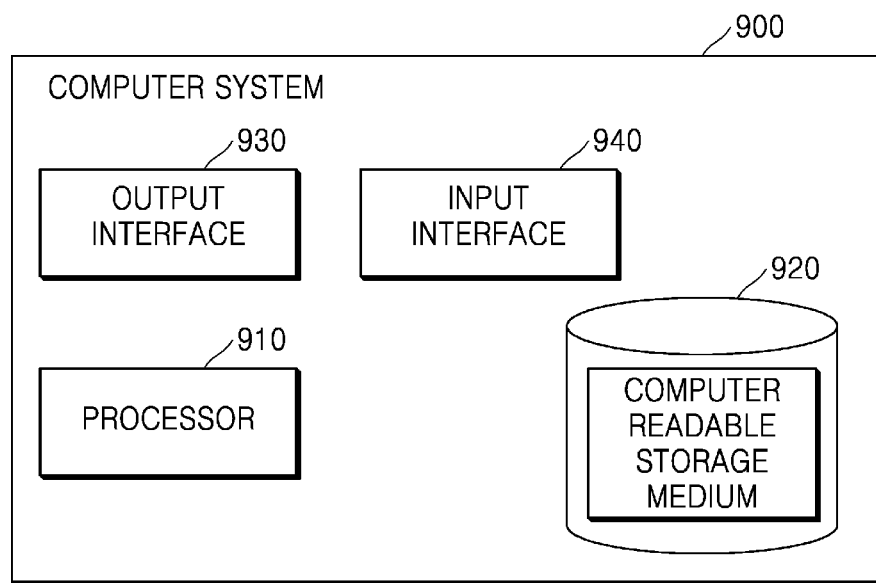
FIG. 9 illustrates, in block diagram format, an example of a computing system that can be used to implement a user equipment or a base station of the present application according to certain embodiments of the present application.

FIG. 9 illustrates, in block diagram format, a user equipment or a computing system of base station that can be used to implement certain methods according to the present application according to various embodiments of the present application.

As shown in the non-limiting example of FIG. 9, a computing system 900 includes a processor 910, a computer readable storage medium 920, an output interface 930, and an input interface 940. The computing system 900 may perform the method described above with reference to FIG. 1 to implement that the UE determines the transmission parameters of data transmission according to the DCI and/or higher layer signaling transmitted by the base station and performs data transmission.

Specifically, the processor 910 may include, for example, a general purpose microprocessor, an instruction set processor, and/or a related chip group and/or a special purpose microprocessor (e.g., an application specific integrated circuit (ASIC)), and the like. The processor 910 may also include an onboard memory for caching purposes. The processor 910 may be a single processing unit or multiple processing units for performing different actions of the method flow described with reference to FIG. 2A or FIG. 2B.

The computer readable storage medium 920, for example, may be any medium that is capable of containing, storing, communicating, propagating or transporting instruction. For example, a readable storage medium may include, but is not limited to, an electronic, magnetic, optical, electromagnetic, infrared, or semiconductor system, apparatus, device, or propagation medium. Examples of the readable storage medium include, without limitation: a magnetic storage device such as a magnetic tape or a hard disk (HDD); an optical storage device such as a compact disk (CD-ROM); a memory such as a random access memory (RAM) or a flash memory; and/or a wired/wireless communication link.

The computer readable storage medium 920 may include a computer program, which may include codes/computer executable instructions that, when executed by the processor 910, cause the processor 910 to perform, for example, the method flow described above in connection with FIG. 2A or FIG. 2B and any variation thereof.

The computer programs may be configured to have, for example, computer program codes comprising a computer program module. For example, in an example embodiment, the code in the computer programs may include one or more program modules, including, for example, module 1, module 2 . . . . It should be noted that the division, manner and number of modules of embodiments according to this disclosure are not fixed, and those skilled in the art may use suitable program module or program module combination according to actual condition. When these program module combinations are executed by the processor 910, the processor 910 may perform, for example, the method flow described above in connection with FIG. 2A or FIG. 2B and any variation thereof.

According to certain embodiments of the present application, the processor 910 can use the output interface 930 and the input interface 940 to perform the method flow described above in connection with FIG. 2A or FIG. 2B and any variations thereof.

In certain embodiments, the above embodiments may be applied to any system, including but not limited to a 5G NR system.

It should be understood that although the various steps in the flowchart of the drawings are sequentially displayed as indicated by the arrows, these steps are not necessarily performed in the sequence indicated by the arrows. Unless otherwise explicitly stated herein, the execution of these steps is not strictly limited, and may be performed in other sequences. Moreover, at least some of the steps in the flowchart of the drawings may include a plurality of sub-steps or stages, which are not necessarily performed at the same time, but may be executed at different times, and the execution sequence thereof is also not necessarily performed sequentially, but may be performed alternately or additionally with at least a portion of other steps or sub-steps or stages of other steps.

The above is only a part of implementation of the present invention. It should be noted that those skilled in the art can also make several improvements and modifications without departing from the principles of the present invention. The improvements and modifications should be considered as within the scope of protection of the present invention.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
    identifying a resource allocated for a first physical uplink shared channel (PUSCH) repetition and a second PUSCH repetition, based on downlink control information (DCI), wherein the first PUSCH repetition and the second PUSCH repetition are associated with consecutive symbols;
    determining at least one symbol to be bypassed for the first PUSCH repetition, based on a radio resource control (RRC) message, wherein the first PUSCH repetition includes one or more repetitions associated with remaining symbols other than the at least one symbol to be bypassed; and
    performing a transmission of the first PUSCH repetition, based on the remaining symbols.

2. The method of claim 1, wherein the at least one symbol is indicated by the RRC message as a downlink.

3. The method of claim 1, wherein the at least one symbol is indicated by the RRC message as not being available for the first PUSCH repetition.

4. The method of claim 1, wherein the DCI indicates a row of a time domain resource allocation (TDRA) table, the row indicating a plurality of parameters for the resource.

5. The method of claim 1, wherein the at least one symbol to be bypassed is associated with the DCI.

6. The method of claim 1, wherein the first PUSCH repetition and the second PUSCH repetition are within a slot.

7. The method of claim 4, wherein the plurality of parameters include a starting symbol and an allocation length.

8. A user equipment (UE) in a wireless communication system, the UE comprising:
    a transceiver; and
    at least one processor coupled with the transceiver and configured to:
        identify a resource allocated for a first physical uplink shared channel (PUSCH) repetition and a second PUSCH repetition, based on downlink control information (DCI), wherein the first PUSCH repetition and the second PUSCH repetition are associated with consecutive symbols;

determine at least one symbol to be bypassed for the first PUSCH repetition, based on a radio resource control (RRC) message, wherein the first PUSCH repetition includes one or more repetitions associated with remaining symbols other than the at least one symbol to be bypassed; and perform, via the transceiver, a transmission of the first PUSCH repetition, based on the remaining symbols.

9. The UE of claim 8, wherein the at least one symbol is indicated by the RRC message as a downlink.

10. The UE of claim 8, wherein the at least one symbol is indicated by the RRC message as not being available for the first PUSCH repetition.

11. The UE of claim 8, wherein the DCI indicates a row of a time domain resource allocation (TDRA) table, the row indicating a plurality of parameters for the resource.

12. The UE of claim 8, wherein the at least one symbol to be bypassed is associated with the DCI.

13. The UE of claim 8, wherein the first PUSCH repetition and the second PUSCH repetition are within a slot.

14. The UE of claim 11, wherein the plurality of parameters include a starting symbol and an allocation length.

15. A method by a base station in a wireless communication system, the method comprising:

transmitting, to a user equipment (UE), a radio resource control (RRC) message;

transmitting, to the_UE, downlink control information (DCI) associated with a resource allocated for first physical uplink shared channel (PUSCH) repetition and a second PUSCH repetition, wherein the first PUSCH repetition and the second PUSCH repetition are associated with consecutive symbols, wherein the RRC message indicates at least one symbol to be bypassed for the first PUSCH repetition, and wherein the first PUSCH repetition includes one or more repetitions associated with remaining symbols other than the at least one symbol to be bypassed; and receiving, from the UE, uplink data, based on the remaining symbols, wherein the uplink data is associated with the first PUSCH repetition.

16. The method of claim 15, wherein the at least one symbol is indicated by the RRC message as a downlink.

17. The method of claim 15, wherein the at least one symbol is indicated by the RRC message as not being available for the first PUSCH repetition.

18. The method of claim 15, wherein the DCI indicates a row of a time domain resource allocation (TDRA) table, the row indicating a plurality of parameters for the resource.

19. The method of claim 15, wherein the at least one symbol to be bypassed is associated with the DCI.

20. The method of claim 15, wherein the first PUSCH repetition and the second PUSCH repetition are within a slot.

* * * * *